United States Patent
Lin et al.

(10) Patent No.: US 9,185,711 B2
(45) Date of Patent: Nov. 10, 2015

(54) METHOD AND APPARATUS FOR MITIGATING RELAY INTERFERENCE

(75) Inventors: Dexu Lin, San Diego, CA (US); Ravi Palanki, San Jose, CA (US); Dhananjay Ashok Gore, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 13/229,426

(22) Filed: Sep. 9, 2011

(65) Prior Publication Data

US 2012/0063369 A1    Mar. 15, 2012

Related U.S. Application Data

(60) Provisional application No. 61/382,841, filed on Sep. 14, 2010.

(51) Int. Cl.
- *H04B 7/14* (2006.01)
- *H04W 72/08* (2009.01)
- *H04B 7/155* (2006.01)
- *H04W 84/04* (2009.01)

(52) U.S. Cl.
CPC ......... *H04W 72/082* (2013.01); *H04B 7/15542* (2013.01); *H04B 7/15571* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 2009/0147706 A1* | 6/2009 | Yu et al. | 370/277 |
| 2010/0002656 A1 | 1/2010 | Ji et al. | |
| 2010/0111018 A1 | 5/2010 | Chang | |
| 2010/0172284 A1* | 7/2010 | Horiuchi et al. | 370/315 |
| 2010/0316096 A1 | 12/2010 | Adjakple et al. | |
| 2010/0331030 A1 | 12/2010 | Nory et al. | |
| 2011/0103292 A1 | 5/2011 | Pasad et al. | |
| 2012/0044857 A1* | 2/2012 | Kim et al. | 370/315 |
| 2013/0044627 A1* | 2/2013 | Jen | 370/252 |

FOREIGN PATENT DOCUMENTS

| | | |
|---|---|---|
| CN | 101515917 A | 8/2009 |
| JP | 2010-003098 A | 1/2010 |
| WO | WO 2010017628 A1 | 2/2010 |
| WO | WO 2010051539 A2 | 5/2010 |
| WO | WO 2010/082752 A2 | 7/2010 |

OTHER PUBLICATIONS

Ghosh, Amitava, et al, "LTE-Advanced: Next-Generation Wireless Broadband Technology", IEEE Wireless Communications, Jun. 2010, pp. 10-22.

(Continued)

*Primary Examiner* — Minh-Trang Nguyen
(74) *Attorney, Agent, or Firm* — Arent Fox LLP

(57) ABSTRACT

Methods and apparatuses are provided that include selecting resources for assigning to a device to mitigate relay self-interference when also communicating with a base station. The resources can be selected based on one or more factors, such as based on resources that are negotiated with the base station, or based on resources indicated as not desired for allocation from the base station, etc. In other examples, reference signals and control data can be communicated such as to mitigate relay self-interference as well.

86 Claims, 15 Drawing Sheets

(56) References Cited

OTHER PUBLICATIONS

"3rd Generation Partnership Project; Technical Specification Group Radio Access Network; Feasibility study for Further Advancements for E-UTRA (LTE-Advanced) (Release 9)", 3rd Generation Partnership Project (3GPP); Technical Report (TR, XX, XX vol. 36.912, No. V2.0.0 Aug. 1, 2009, pp. 1-52, XP002583321, Retrieved from the Internet : URL: http : //www. 3gpp. org/ftp/Specs/html—info/36912.htm [ retrieved on May 20, 2010].
International Search Report and Written Opinion—PCT/US2011/051211—ISA/EPO—Dec. 28, 2011.
Translation of First Office Action issued in Japanese Patent Application No. 2013-529223, dated Dec. 17, 2013, 2 pages.
Samsung, "Full duplex multiplexing of Un an Uu subframes," 3GPP TSG RAN WGI Meeting #60, San Francisco, USA, Feb. 22-26, 2010, pp. 1-3.
Interdigital Communications LLC, "Link-level results for R-PDCCH multiplexing using FDM and TDM+FDM," 3GPP TSG-RAN WGI Meeting #60, San Francisco, USA, Feb. 22-26, 2010, pp. 108.
Translation of First Office Action issued in Korean Patent Application No. 2013-7009452, dated Apr. 29, 2014, 6 pages.
Samsung, "Full duplex multiplexing of Un and Uu subframes," 3GPP TSG RAN WGI Meeting #60, San Francisco, USA, Feb. 22-26, 2010, pp. 1-3.

* cited by examiner

METHOD AND APPARATUS FOR MITIGATING RELAY INTERFERENCE

CLAIM OF PRIORITY UNDER 35 U.S.C. §119

The present Application for Patent claims priority to Provisional Application No. 61/382,841, entitled METHOD AND APPARATUS FOR MITIGATING RELAY INTERFERENCE, filed Sep. 14, 2010, assigned to the assignee hereof and hereby expressly incorporated by reference herein.

BACKGROUND

1. Field

The following description relates generally to wireless network communications, and more particularly to considerations for mitigating relay self-interference.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In addition, relays can be used in some wireless communication systems to expand base station coverage, improve communication throughput, and/or the like. For example, relays can be assigned resources from a base station (much like a device), and can assign resources to a device (much like a base station). Upon receiving communications from the base station over the resources assigned by the base station, the relay can transmit the communications to one or more intended devices over resources assigned thereto by the relay, and vice versa. The relay can perform decoding/encoding of signals received before transmitting to the intended device or base station. Relays can operate in half duplex mode, where at any given time, the relays receive signals from a base station or transmit to a device, but typically not both.

Relays can also, however, operate in full duplex mode where the relay can transmit and receive at the same time (e.g., in the same frequency band). In this example, a relay can cause interference to itself, for example, by transmitting to a device on a frequency band at the same time as receiving signals from a base station on the same (or an adjacent or otherwise near) frequency band. Spatial separation of backhaul link antennas (e.g., for communicating with a base station) and access link antennas (e.g., for communicating with one or more devices) has been proposed to cure such interference, however, this solution is not always feasible for all relay deployments, and this solution can have high associated cost. Various interference cancellation techniques have also been proposed to cancel the interference after-the-fact.

Thus, improvements in the operation of relays are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with mitigating or at least minimizing self-interference before occurrence at a relay, which can diminish the need for interference cancellation techniques or otherwise improve efficiency of such techniques. In an example, the relay can assign downlink resources for transmitting to one or more devices, and can attempt to cause a base station to avoid these resources when assigning downlink resources to the relay. In other examples, the relay can avoid reference signal collision with the base station to allow the relay to obtain the reference signal for decoding downlink communications from the base station. In further examples, the relay can mitigate interference over control channels by reducing an aggregation level, assigning control resources outside of a control region with the base station, and/or the like. Similar considerations are provided for uplink communications (e.g., attempting to influence the base station scheduling of uplink resources for the relay, uplink reference signal collision mitigation/management, control data considerations, etc.).

According to an example, a method of wireless communication in a full duplex relay is provided including receiving an allocation of a first set of resources within a carrier over a subframe for receiving first signals from a base station and selecting a second set of resources within the carrier over the subframe that mitigate self-interference with the first set of resources for communicating with a device. The method also includes transmitting second signals to the device on the second set of resources.

In another aspect, an apparatus for wireless communication in a full duplex relay is provided. The apparatus includes at least one processor configured to receive an allocation of a first set of resources within a carrier over a subframe for receiving first signals from a base station and select a second set of resources within the carrier over the subframe that mitigate self-interference with the first set of resources for communicating with a device. The at least one processor is further configured to transmit second signals comprising to the device on the second set of resources. The apparatus also includes a memory coupled to the at least one processor.

In yet another aspect, an apparatus for wireless communication in a full duplex relay is provided that includes means for receiving an allocation of a first set of resources within a carrier over a subframe for receiving first signals from a base station and means for selecting a second set of resources within the carrier over the subframe that mitigate self-interference with the first set of resources for communicating with a device. The apparatus further includes means for transmitting second signals to the device over the second set of resources.

Still, in another aspect, a computer-program product for wireless communication in a full duplex relay is provided including a computer-readable medium having code for causing at least one computer to receive an allocation of a first set of resources within a carrier over a subframe for receiving first signals from a base station and code for causing the at least one computer to select a second set of resources within the carrier over the subframe that mitigate self-interference with the first set of resources for communicating with a device. The computer-readable medium further includes code for causing the at least one computer to transmit second signals to the device on the second set of resources.

Moreover, in an aspect, an apparatus for wireless communication in a full duplex relay is provided that includes a resource allocation receiving component for receiving an allocation of a first set of resources within a carrier over a subframe for receiving first signals from a base station and a device resource allocating component for selecting a second set of resources within the carrier over the subframe that mitigate self-interference with the first set of resources for communicating with a device. The apparatus further includes a communicating component for transmitting second signals to the device over the second set of resources.

In another example, a method of wireless communication in a full duplex relay is provided including receiving an allocation of a first set of resources within a carrier over a subframe from a base station for transmitting signals from a device to the base station and selecting a second set of resources within the carrier over the subframe that mitigate self-interference with the first set of resources for receiving signals from the device. The method also includes allocating the second set of resources to the device.

In another aspect, an apparatus for wireless communication in a full duplex relay is provided. The apparatus includes at least one processor configured to receive an allocation of a first set of resources within a carrier over a subframe from a base station for transmitting signals to the base station and select a second set of resources within the carrier over the subframe that mitigate self-interference with the first set of resources for receiving signals from the device. The at least one processor is further configured to allocate the second set of resources to the device. The apparatus also includes a memory coupled to the at least one processor.

In yet another aspect, an apparatus for wireless communication in a full duplex relay is provided that includes means for receiving an allocation of a first set of resources within a carrier over a subframe from a base station for transmitting signals to the base station. The apparatus further includes means for selecting a second set of resources within the carrier over the subframe that mitigate self-interference with the first set of resources for receiving signals from the device, and allocating the second set of resources to the device.

Still, in another aspect, a computer-program product for wireless communication in a full duplex relay is provided including a computer-readable medium having code for causing at least one computer to receive an allocation of a first set of resources within a carrier over a subframe from a base station for transmitting signals to the base station. The computer-readable medium further includes code for causing the at least one computer to select a second set of resources within the carrier over the subframe that mitigate self-interference with the first set of resources for receiving signals from the device and code for causing the at least one computer to allocate the second set of resources to the device.

Moreover, in an aspect, an apparatus for wireless communication in a full duplex relay is provided that includes a resource allocation receiving component for receiving an allocation of a first set of resources within a carrier over a subframe from a base station for transmitting signals to the base station and a component for selecting a second set of resources within the carrier over the subframe that mitigate self-interference with the first set of resources for receiving signals from the device, and allocating the second set of resources to the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
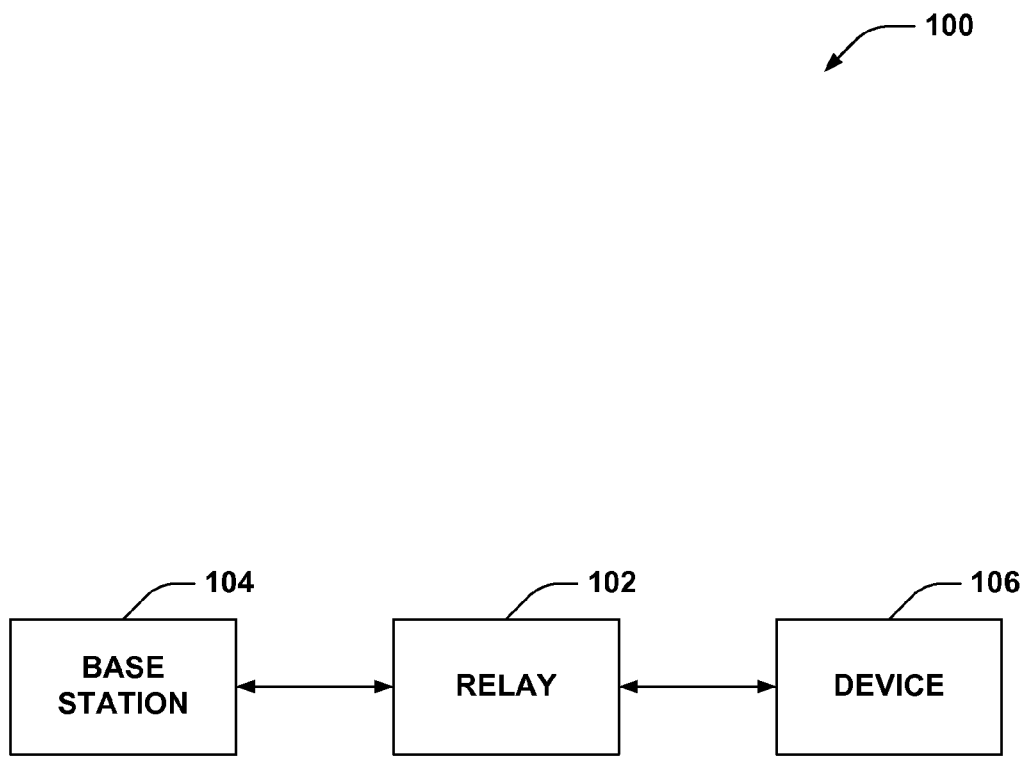
FIG. 1 is a block diagram of an aspect of a system employing a relay in wireless communications.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described further herein are various considerations related to mitigating self-interference in a relay caused by transmitting signals to a device while receiving signals from a base station and/or vice versa. For example, a relay can attempt to influence selection of downlink resources assigned to the relay by a base station, and the relay can accordingly assign other downlink resources for communicating with one or more devices. In one example, the relay can report low channel quality over a set of resources it intends to assign to one or more devices, and thus the base station may not assign the set of resources to the relay. In another example, the relay can negotiate the resources with the base station. Moreover, the relay can mitigate reference signal collision between the relay and base station by utilizing other reference signals from the base station for decoding communications therefrom, by refraining from transmitting a reference signal in certain time intervals, and/or the like. Additionally, the relay can use a lower aggregation level for certain communications to mitigate interference thereover, and/or in some cases can schedule around resources scheduled by the base station—e.g., where the resources as semi-statically configured.

Furthermore, the relay can use similar techniques for uplink resource assignments from the base station. For example, the relay can transmit a sounding reference signal (SRS) at a low or substantially muted power on certain resources which the relay can assign to one or more devices for uplink communications. In another example, the relay can negotiate the uplink resources, as described. Moreover, the relay can utilize different sequences for communicating dedicated reference signals (DRS) so as not to interfere with those transmitted by a device, and/or can avoid SRS collision by using a narrowband SRS, defining a SRS hopping sequence for the device that does not collide with the SRS of the relay, etc. In addition, the relay can over-provision a control data region, and select non-overlapping resources for receiving control data from the device to mitigate interference to control data resources assigned for the relay by the base station, and/or can cause devices to transmit control data over shared data channel or other resources that do not collide with control data resources. In this regard, the issue of self-interference over downlink or uplink resource assignments can be mitigated or eliminated.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, mobile station, remote station, remote terminal, access terminal, user terminal, communication device, user agent, user device, or user equipment (UE), etc. A wireless terminal may be a cellular telephone, a smart phone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates providing a relay in wireless communications. System 100 includes a relay 102 that obtains signals from base station 104, and transmits the signals to device 106. As described, the relay 102 can receive a downlink resource allocation from base station 104 and can obtain the signals over resources in the allocation. Similarly, the relay 102 can allocate downlink resources to device 106 and can transmit the signals over the downlink resources. The relay 102 can first decode communications received from the base station 104, obtain relevant data, and encode the data for transmission to device 106. In addition, relay 102 can allocate uplink resources to device 106, over which device 106 can transmit signals, and relay 102 can forward the signals to base station 104—e.g., after decoding/encoding—over a set of uplink resources received from base station 104. Moreover, relay 102 can be a full duplex relay such that it can receive from base station 104 while transmitting other signals to device 106 (and/or vice versa).

For example, relay 102 can be a full duplex relay, a UE relay (e.g., a UE that communicates with a base station while allowing other UEs to connect to the UE relay to receive communications of the base station), a portion thereof, and/or the like. Moreover, for example, base station 104 can be a macrocell, femtocell, picocell, or similar base station, a mobile base station, another relay, a device communicating in peer-to-peer or ad-hoc mode, a portion thereof, and/or the like. Device 106 can be a UE, a modem (or other tethered device), a portion thereof, and/or the like, for example.

According to an example, relay 102 can mitigate self-interference at least in part by assigning resources to device 106 that do not overlap resources assigned by base station 104 to relay 102. In one example, relay 102 can attempt to influence assignment of downlink resources at the base station 104 for relay 102. This can include negotiating a resource assignment, indicating low channel quality over a set of resources for which assignment is not desired, indicating a high channel quality over a set of resources for which assignment is desired, and/or the like. Relay 102 can accordingly assign resources to device 106 so as not to interfere with an expected resource assignment from base station 104 in view of the attempted influence. Relay 102 can use similar techniques to attempt to influence uplink resource assignment from base station 104, such as resource negotiation therewith, transmitting an SRS with a signal power below a threshold level over resources for which assignment is not desired, transmitting an SRS with a signal power above a threshold level over resources for which assignment is desired, and/or the like.

In other examples, base station 104 can utilize different reference signals for indicating decoding and/or channel estimation information to the relay 102 to mitigate collision with downlink reference signals transmitted by relay 102. In another example, the relay 102 can refrain from transmitting reference signals in one or more time intervals to properly receive a reference signal from base station 104 without collision. Moreover, for uplink reference signals from device 106, the relay 102 can utilize different sequences for its reference signals and/or assign different hopping patterns to device 106 for reference signals to mitigate collision of the uplink reference signals.

In further examples, relay 102 can use a lower aggregation level when transmitting control data to device 106 to diminish self-interference caused by the transmission, and/or can schedule downlink control channels around a control region configured by the base station 104, where the control region is semi-statically configured. Moreover, for uplink control transmissions, relay 102 can over-provision the uplink control region, and assign device 106 control resources that do not overlap the region assigned to relay 102 as control resources by the base station 104. In another example, relay 102 can instruct the device 106 to transmit control data over data channel resources to avoid control channel collision.

Figure 2:
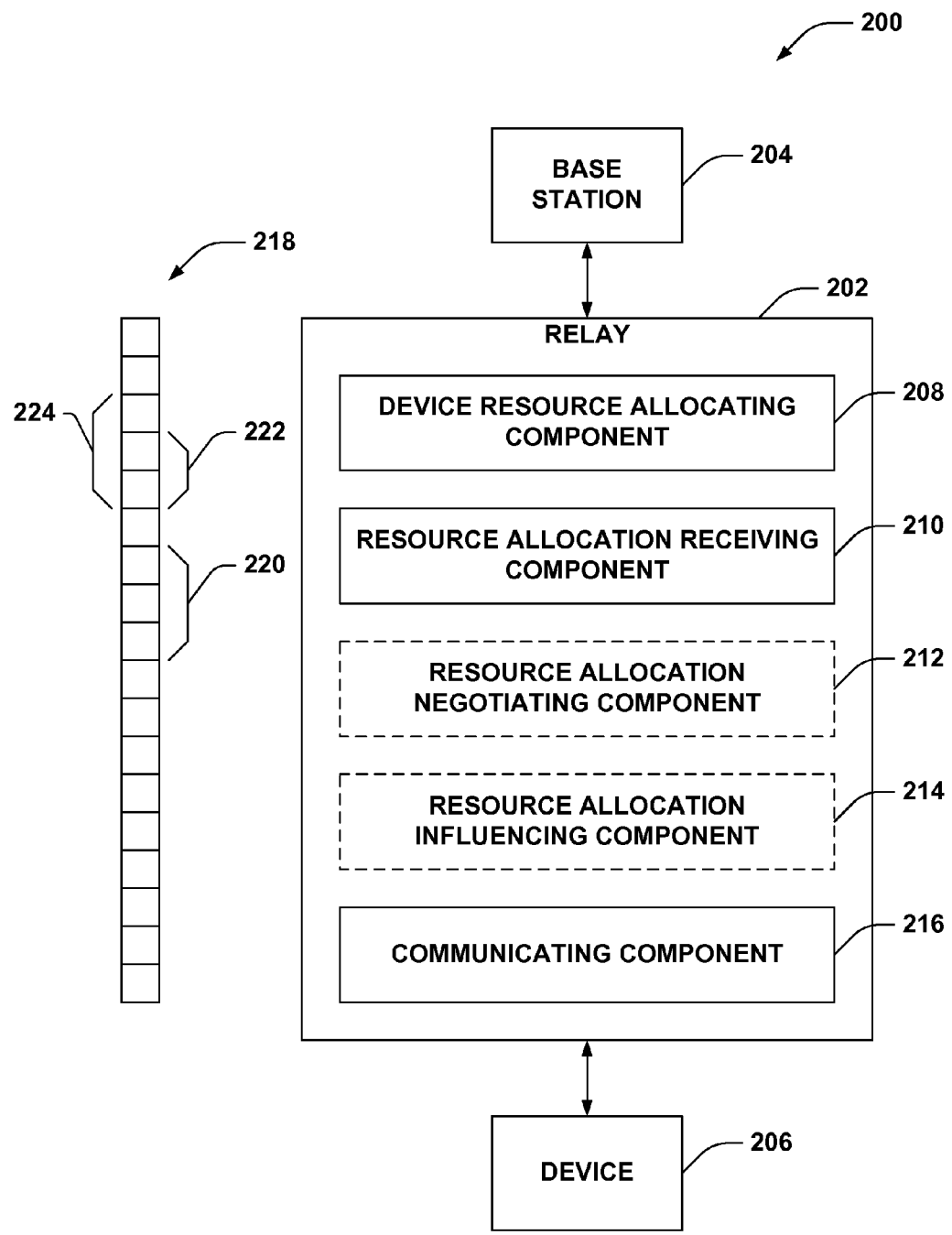
FIG. 2 is a block diagram of an aspect of a system for indicating resources for which allocation is not desired from a base station to mitigate relay self-interference.

Turning now to FIG. 2, an example wireless communication system 200 that facilitates negotiating or otherwise attempting to influence base station resource assignment to mitigate relay self-interference is depicted. System 200 includes a relay 202 that transmits signals from a base station 204 to a device 206 and/or vice versa, as described. Relay 202 can be a full duplex relay, UE relay, etc., base station 204 can be a macrocell, femtocell, picocell, or other base station, etc., and device 206 can be a UE, modem, etc., as described.

Relay 202 can include a device resource allocating component 208 for assigning a set of resources to a device for communicating therewith, and a resource allocation receiving component 210 that obtains a different set of resources from a base station for communicating therewith. Relay 202 can also optionally include a resource allocation negotiating component 212 for communicating with the base station to determine a downlink or uplink resource allocation for the relay 202, and/or a resource allocation influencing component 214 for attempting to cause the base station to allocate or refrain from allocating certain resources to the relay 202. Relay 202 can also include a communicating component 216 for transmitting to or receiving from the base station and/or device.

According to an example, device resource allocating component 208 can determine a set of resources for allocating to device 206. For example, device resource allocating component 208 can avoid assigning resources to the device 206 that are expected to be received in a resource allocation from base station 204. In one example, resource allocation negotiating component 212 can communicate with base station 204 to determine an uplink or downlink resource allocation for relay 202 to receive signals from and/or transmit signals to base station 204. In this example, once a set of resources are negotiated, the resource allocation receiving component 210 can obtain an indication of the set of resources from base station 204, and device resource allocating component 208 can avoid assigning such resources to the device 206. Communicating component 216 can receive downlink signals from the base station 204 over the resources. The resource allocations from base station 204, however, can be modified over time.

In another example, resource allocation influencing component 214 can attempt to influence resource allocation from the base station 204. In this example, resource allocation influencing component 214 can send a poor channel quality report for downlink resources that device resource allocating component 208 has allocated or plans to allocate to one or more devices, such as device 206. For example, base station 204 can assign an uplink control channel to relay 202 for reporting feedback related to a set of resources. In this example, relay 202 can communicate a channel quality indicator (CQI) or other channel quality value for a set of downlink resources that is under a threshold CQI level such as to cause base station 204 to consider allocating other downlink resources to the relay 202. Device resource allocating component 208 can then allocate these downlink resources to the device 206 for communicating downlink signals thereto using communicating component 216—e.g., while receiving signals from base station 204 over other non-overlapping resources assigned by base station 204. Thus, self-interference is mitigated where the base station 204 does not allocate these downlink resources to relay 202. In addition, if the resource allocation receiving component 210 does assign colliding resources, due to the reported CQI, the resources can use a low modulation and coding scheme (MCS) due to the reported CQI, and thus will cause a lower level of interference. It is to be appreciated that relay 202 can report true measured CQI for other resources to base station 204.

In yet another example, resource allocation influencing component 214 can report good CQI (e.g., over a threshold CQI level) to base station 204 for a set of downlink resources to attempt to obtain an allocation from the base station 204 over the set of downlink resources. In this example, device resource allocating component 208 can allocate downlink resources other than the set of downlink resources for communicating with device 206. In either case, where resource allocation receiving component 210 receives an allocation of downlink resources from base station 204 that is different from those allocated to the device 206, the issue of self-interference does not exist.

Similarly, for uplink resources, resource allocation influencing component 214 can utilize a reference signal, which base station 204 typically utilizes to assign resources to a device, to attempt to avoid assignment or influence assignment of a set of uplink resources. For example, resource allocation influencing component 214 can transmit a SRS with power reduced to under a threshold level or with muted power over a set of resources such that base station 204, upon receiving the SRS, may avoid allocating the set of resources based on the low or muted power of the SRS. In this regard, device resource allocating component 208 can allocate at least a portion of the set of resources for uplink communications from device 206. For example, communicating component 216 can receive the uplink communications from the device 206 over the set of resources while transmitting to base station 204 over other non-overlapping resources assigned by the base station 204. In another example, resource allocation influencing component 214 can transmit SRS with high power over a set of uplink resources to attempt to influence base station 204 to allocate the set of uplink resources to relay 202, and thus device resource allocating component 208 can avoid assigning resources in the set of uplink resources to device 206.

In both cases (e.g., for uplink and downlink resources) it is to be appreciated that device resource allocating component 208 can allocate semi-persistent resources to the device 206. In this example, resource allocation negotiating component 212 and/or resource allocation influencing component 214 can negotiate and/or attempt to influence allocation of other resources outside of the semi-persistent allocation from base station 204 using the techniques described above.

In a specific example, a set of resources 218 is depicted, which can represent a set of frequency and/or time resources corresponding to resources assignable between the base station 204 and relay 202, as well as between relay 202 and device 206. In another example, the resources 218 can represent one or more frequency subcarriers over one or more OFDM symbol periods, one or more logical channels, and/or the like. In this example, resource allocation negotiating component 212 can negotiate resources 220 for communications to/from base station 204, and device resource allocating component 208 can thus assign resources 222 (or other non-overlapping resources) to device 206. In another example, resource allocation influencing component 214 can report poor CQI, transmit a low power SRS, etc. over resources 224 such that base station 204 may not assign the resources to relay 202. In this regard, device resource allocating component 208 can assign resources 222, or other resources that are at least a subset of resources 224, to device 206. Resource allocation receiving component 210 can receive allocation of resources 220, for example, outside of the resources 224.

Figure 3:
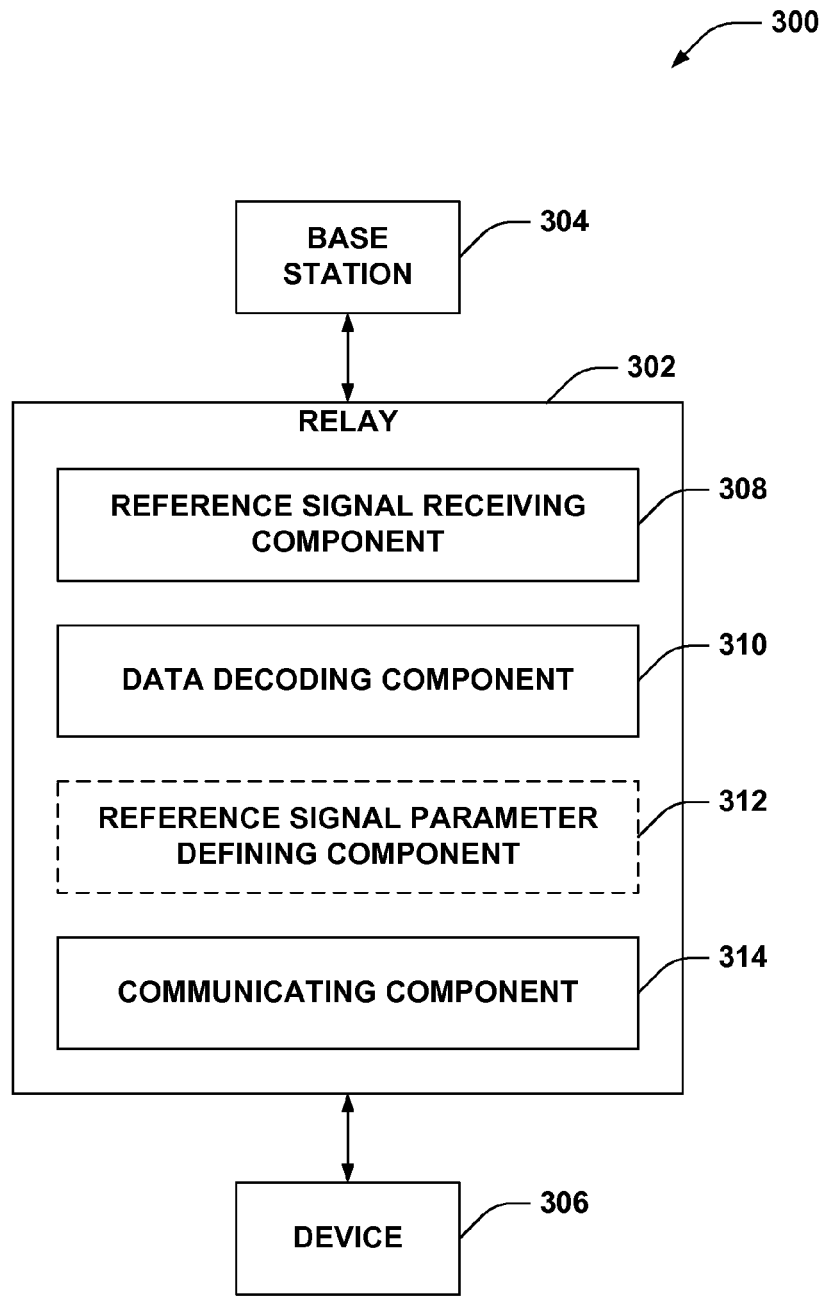
FIG. 3 is a block diagram of an aspect of a system for transmitting reference signals to mitigate relay self-interference.

FIG. 3 illustrates an example wireless communication system 300 that mitigates self-interference of reference signals in a relay configuration. System 300 includes a relay 302 that transmits signals from a base station 304 to a device 306 and/or vice versa, as described. Relay 302 can include a reference signal receiving component 308 for obtaining a reference signal from a base station, a data decoding component 310 for decoding communications from the base station based at least in part on the reference signal, an optional reference signal parameter defining component 312 for generating one or more parameters related to transmitting reference signals at relay 302 or a device, and a communicating component 314 for transmitting to or receiving from the base station and/or device.

According to an example, reference signal receiving component 308 can obtain a reference signal from base station 304 for decoding communications for transmitting to device 306. The reference signal can be a cell-specific reference signal from the base station 304, which can collide with a cell-specific reference signal transmitted by relay 302 (e.g., by communicating component 314). Thus, reference signal receiving component 308 can additionally or alternatively receive other reference signals from base station 304, such as one or more UE-specific reference signals, which can be communicated over different resources, in one example. Thus, data decoding component 310 can decode communications from base station 304 using the UE-specific reference signal. It is to be appreciated that communicating component 314 can transmit a different UE-specific reference signal and/or a cell-specific reference signal of relay 302 to device 306 for decoding the communications.

In another example, reference signal receiving component 308 can declare one or more subframes as a multimedia broadcast over a single-frequency network (MBSFN) subframe to receive the cell-specific reference signal from the base station 304. In this example, where a subframe is declared as MBSFN, the relay 302 does not transmit a cell-specific reference signal in the data region, and thus can receive the cell-specific reference signal from base station 304 without self-interference caused by simultaneously transmitting a cell-specific reference signal. In one example, reference signal receiving component 308 can determine one or more subframes to declare as MBSFN based at least in part on detecting a subframe where a reference signal from relay 302 will collide with that from base station 304. For example, the relay 202 can know the pattern utilized by the base station 304, and thus reference signal receiving component 308 can determine colliding subframes based at least in part on the pattern and the subframes during which the relay 302 schedules reference signal transmissions.

In another example, for uplink reference signals such as DRS, SRS, etc., reference signal parameter defining component 312 can generate parameters to ensure non-colliding transmission of uplink signals from relay 302 and device 306. In one example, reference signal parameter defining component 312 can assign a modulation sequence (e.g., Zadoff-Chu sequence), phase rotation, hopping pattern, etc., for reference signals of device 306 that is different from that used by relay 302. Communicating component 314 can indicate the parameters to device 306, for example, such that the device 306 can implement the parameters for generating reference signals. For example, using a different hopping pattern can lessen the change of colliding resources; however, if the resources do collide, the reference signals can be distinguished based on the different modulation sequence (e.g., a different Zadoff-Chu or similar sequence), phase rotation, etc.

Figure 4:
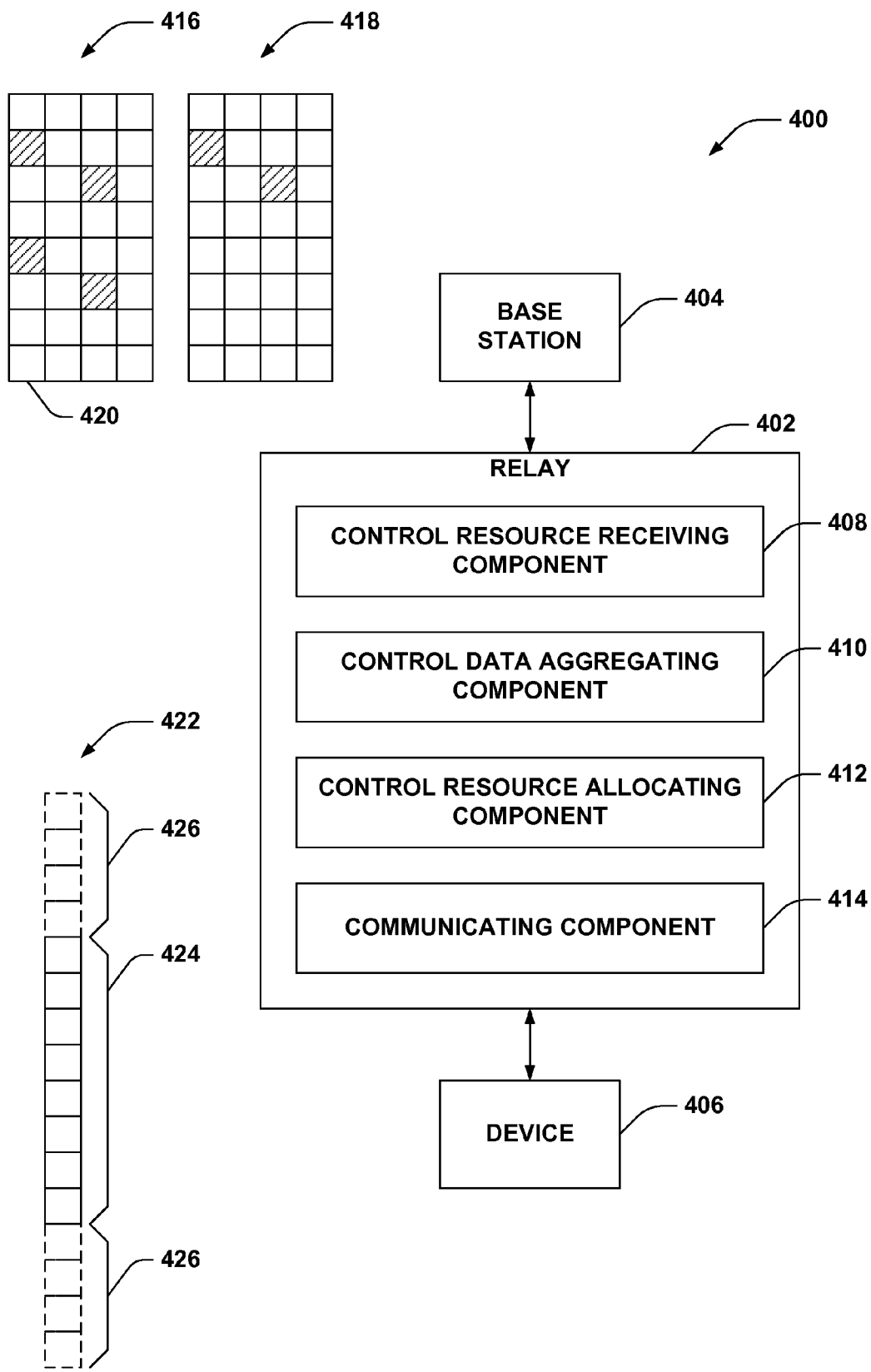
FIG. 4 is a block diagram of an aspect of a system for communicating control data to mitigate relay self-interference.

Turning to FIG. 4, an example system 400 for allocating control resources to mitigate relay self-interference is depicted. System 400 includes a relay 402 that transmits signals from a base station 404 to a device 406 and/or vice versa, as described. Relay 402 can include a control resource receiving component 408 for obtaining a control resource allocation from a base station, a control data aggregating component 410 for aggregating control resources for transmitting control data to one or more devices, a control resource allocating component 412 for assigning control resources to the one or more devices, and a communicating component 414 for receiving signals from or transmitting signals to the base station and/or device.

According to an example, control resource receiving component 408 can obtain a control resource assignment from base station 404, which can be in a data region defined in LTE, such as a relay-physical downlink control channel (R-PDCCH) region. In some systems, R-PDCCH includes a frequency division multiplexed region, which is semi-statically configured, and the control resource allocating component 412 can allocate data resources to device 406 in the downlink data region that does not collide with the R-PDCCH.

In another example, to mitigate self-interference, control data aggregating component 410 can utilize a lower aggregation of tones for transmitting the control data to device 406 than that typically utilized for such purposes (e.g., in LTE). In this example, thus, a less number of resources have the chance of being self-interfered by the transmission from relay 402 to device 406. Communicating component 414 can transmit the lower level of aggregated tones representing the control data to device 406.

In a specific example, collections of frequency tones 416 and 418 are depicted, each including a number of tones 420. The tones, for example, can represent frequency subcarriers within a frequency band over a certain time slot, which can correspond to an OFDM symbol in an OFDM example. As shown, communicating component 414 can receive control data over four tones in the collection of tones 416. Control data aggregating component 410, however, can encode the received control data over two tones in collection of tones 418 for transmitting to device 406. In this example, where communicating component 414 receives a signal over similar resources from base station 404, interference from transmitting control data is caused over two tones instead of four tones.

In another example relating to uplink resources, control resource allocating component 412 can define a control region for relay 402 that is larger than a control region for uplink communications between relay 402 and base station 404, which can be referred to as over-provisioning the control region. Within the over-provisioned control region, control resource allocating component 412 can allocate control resources to device 406 that do not overlap the control region for relay 402/base station 404 communications. Since the resources are not overlapped, the issue of self-interference can be mitigated. In a specific example, given a collection of resources 422, a control region 424 for control data communications between relay 402 and base station 404 is defined. In this example, control resource allocating component 412 can over-provision the control region by resources 426, and can assign resources from the over-provisioned region to device 406 for communicating control data therewith to avoid interfering with control communications between relay 402 and base station 404.

In yet another example, control resource allocating component 412 can allocate shared data channel resources (e.g., physical uplink shared channel (PUSCH) resources) over which device 406 can transmit control data to relay 402. In one example, control resource allocating component 412 can send a grant for shared data channel resources to device 406 to prompt the device 406 to communicate control data to relay 402.

Referring to FIGS. 5-10, example methodologies relating to mitigating relay self-interference are illustrated. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 5:
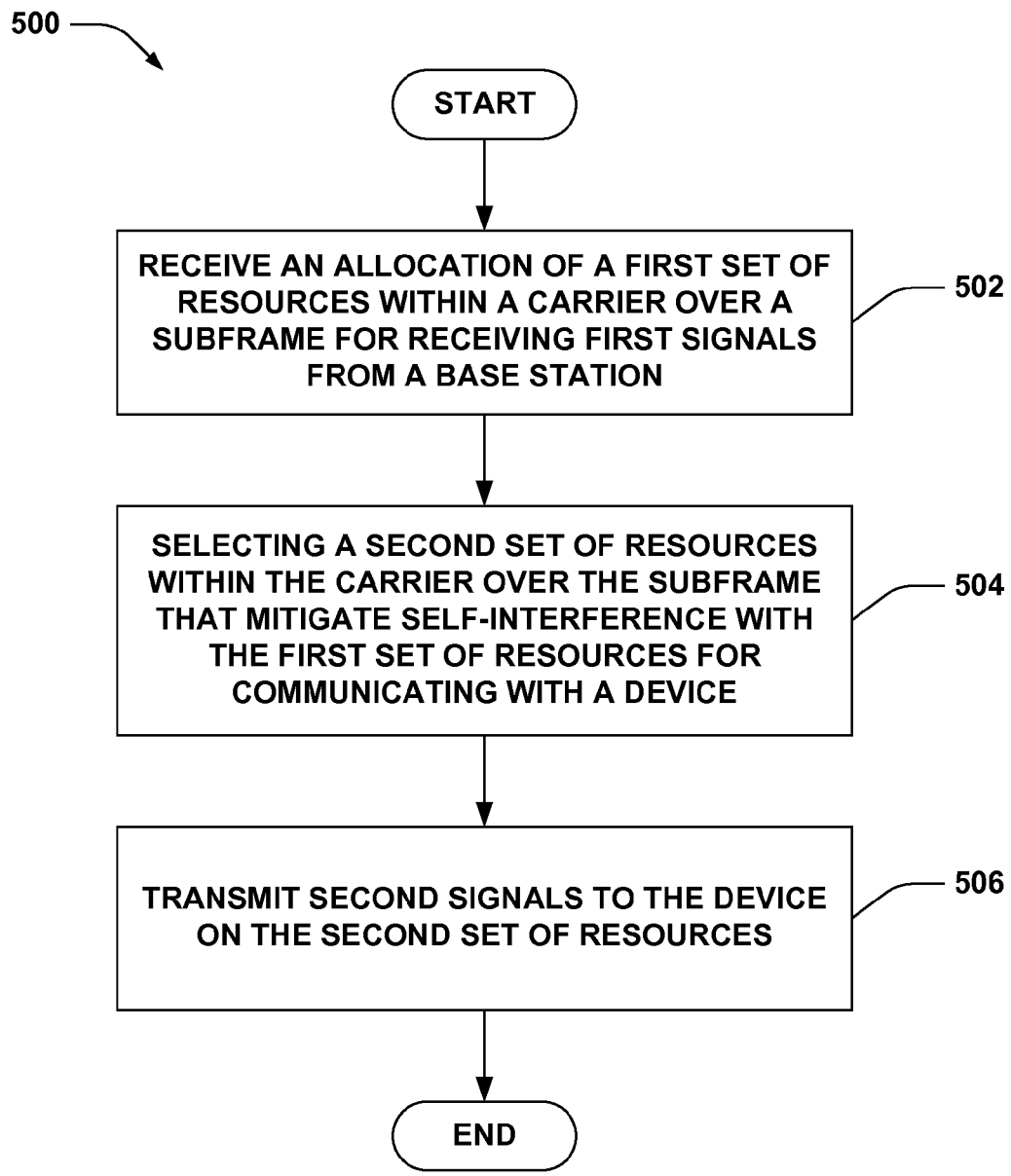
FIG. 5 is a flow chart of an aspect of a methodology for selecting downlink resources for a device to mitigate relay self-interference with base station communications.

Turning to FIG. 5, an example methodology 500 for mitigating relay self-interference is illustrated. At 502, an allocation of a first set of resources within a carrier over a subframe can be received for receiving first signals from a base station. At 504, a second set of resources within the carrier over the subframe that mitigate self-interference with the first set of resources can be selected for communicating with a device. In one example, this can occur before the allocation is received at 502. In this example, a low CQI or other quality indicator can be specified for a set of resources over which allocation is not desired from the base station. It can be unlikely that the base station assigns this set of resources, and thus the set of resources can then be allocated for the device such as to mitigate self-interference of transmitting to the device during resources used to receive signals from the base station. In another example, where the first set of resources are semi-statically assigned, the selecting at step 504 can include selecting resources around the semi-static assignment. At 506, second signals can be transmitted to the device on the second set of resources.

Figure 6:
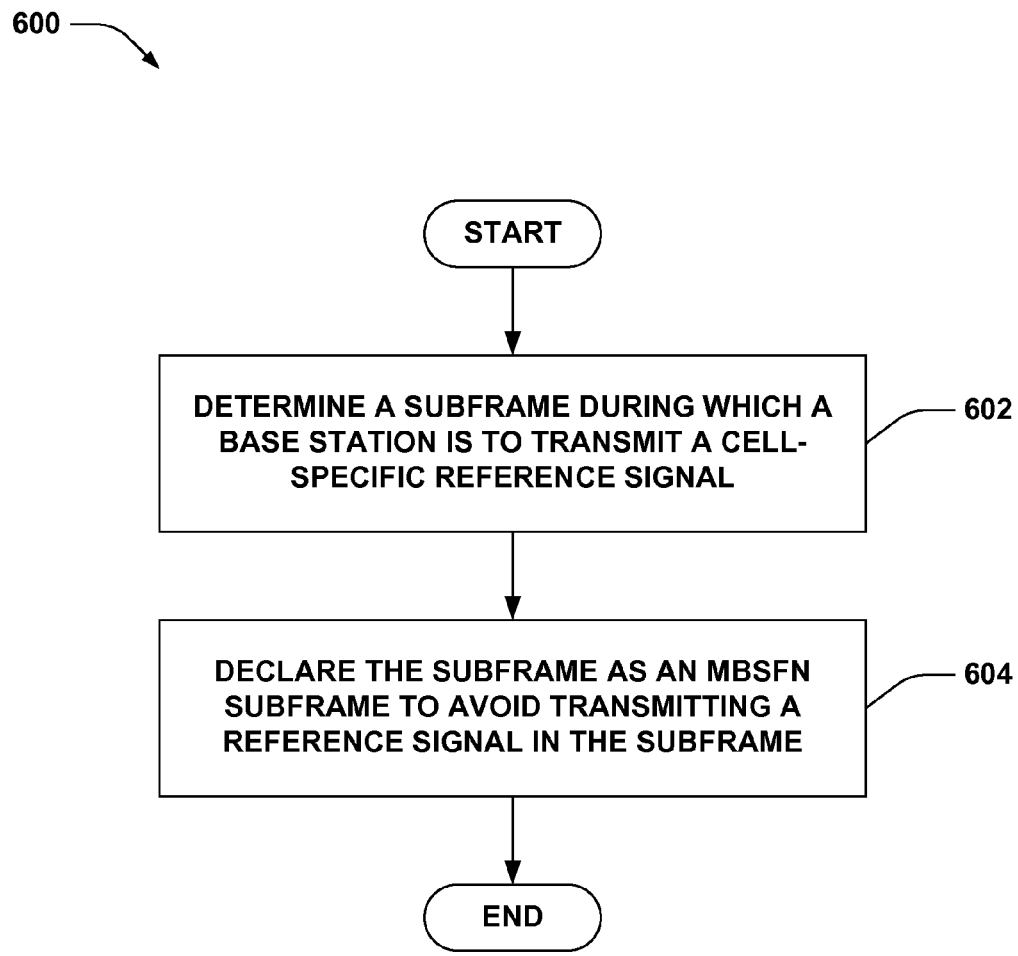
FIG. 6 is a flow chart of an aspect of a methodology for refraining from transmitting reference signals to mitigate relay self-interference.

Referring to FIG. 6, an example methodology 600 is shown for avoiding self-interference from a transmitted reference signal when receiving a reference signal. At 602, a subframe during which a base station is to transmit a cell-specific reference signal can be determined. As described, this can be determine based at least in part on a received schedule of reference signal transmissions from the base station, predicting a subframe for reference signal transmission based at least in part on previous reference signal transmissions, and/or the like. At 604, the subframe can be declared as an MBSFN subframe to avoid transmitting a reference signal in a data region of the subframe.

Figure 7:
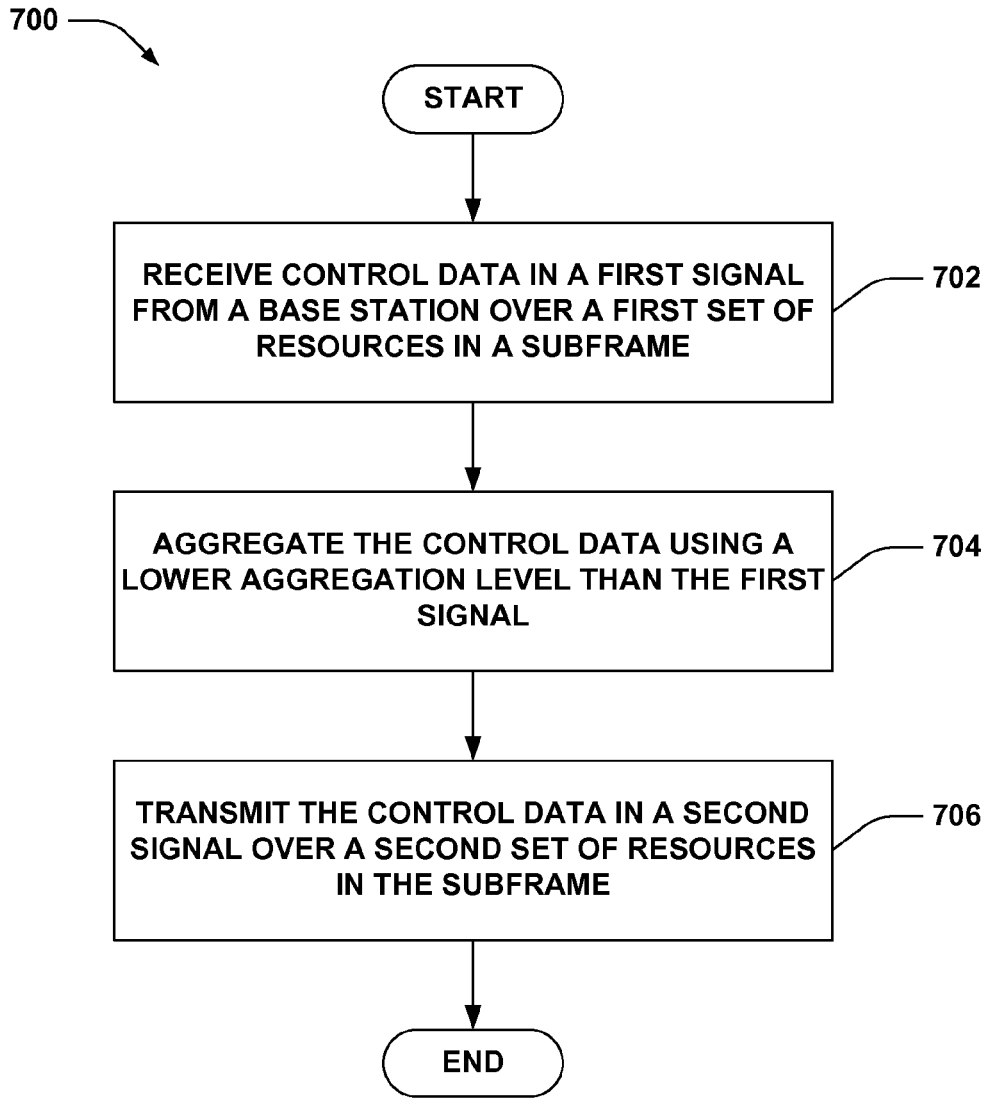
FIG. 7 is a flow chart of an aspect of a methodology for aggregating control data to mitigate possible self-interference caused by transmitting the control data.

Turning to FIG. 7, an example methodology 700 is illustrated for communicating control data to mitigate self-interference. At 702, control data can be received. At 704, the control data can be aggregated using a lower aggregation level than utilized for other control data transmissions. For example, this can be based on determining at least a possibility of relay self-interference. At 706, the control data can be transmitted to a device. As described, using the lower aggregation level can lessen the amount of self-interference possibly caused by the control data transmission since transmission occurs over a smaller portion of frequency tones.

Figure 8:
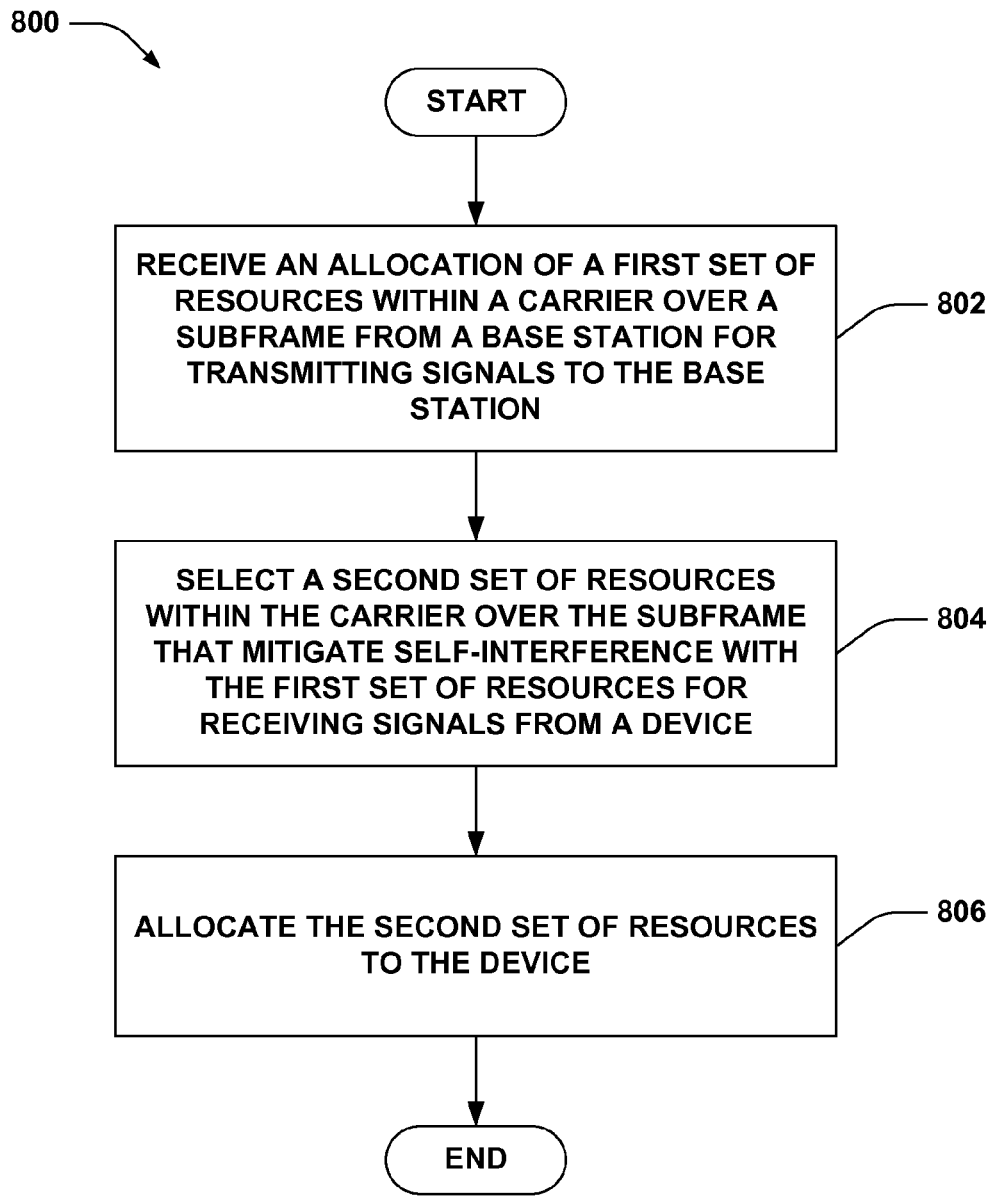
FIG. 8 is a flow chart of an aspect of a methodology for selecting uplink resources for a device to mitigate relay self-interference with base station communications.

Referring to FIG. 8, an example methodology 800 that facilitates mitigating relay self-interference is illustrated. At 802, an allocation of a first set of resources within a carrier over a subframe can be received from a base station for transmitting signals to the base station. At 804, a second set of resources within the carrier over the subframe that mitigate self-interference with the first set of resources can be selected for receiving signals from a device. For example, the second set of resources can be selected before receiving the allocation at 802. In one example, a SRS can be transmitted at a low or muted power over a set of resources to attempt to prevent the base station from allocating the set of resources. Thus, the second set of resources can be selected from at least a portion of the set of resources to mitigate self-interference. At 806, the second set of resources can be allocated to the device.

Figure 9:
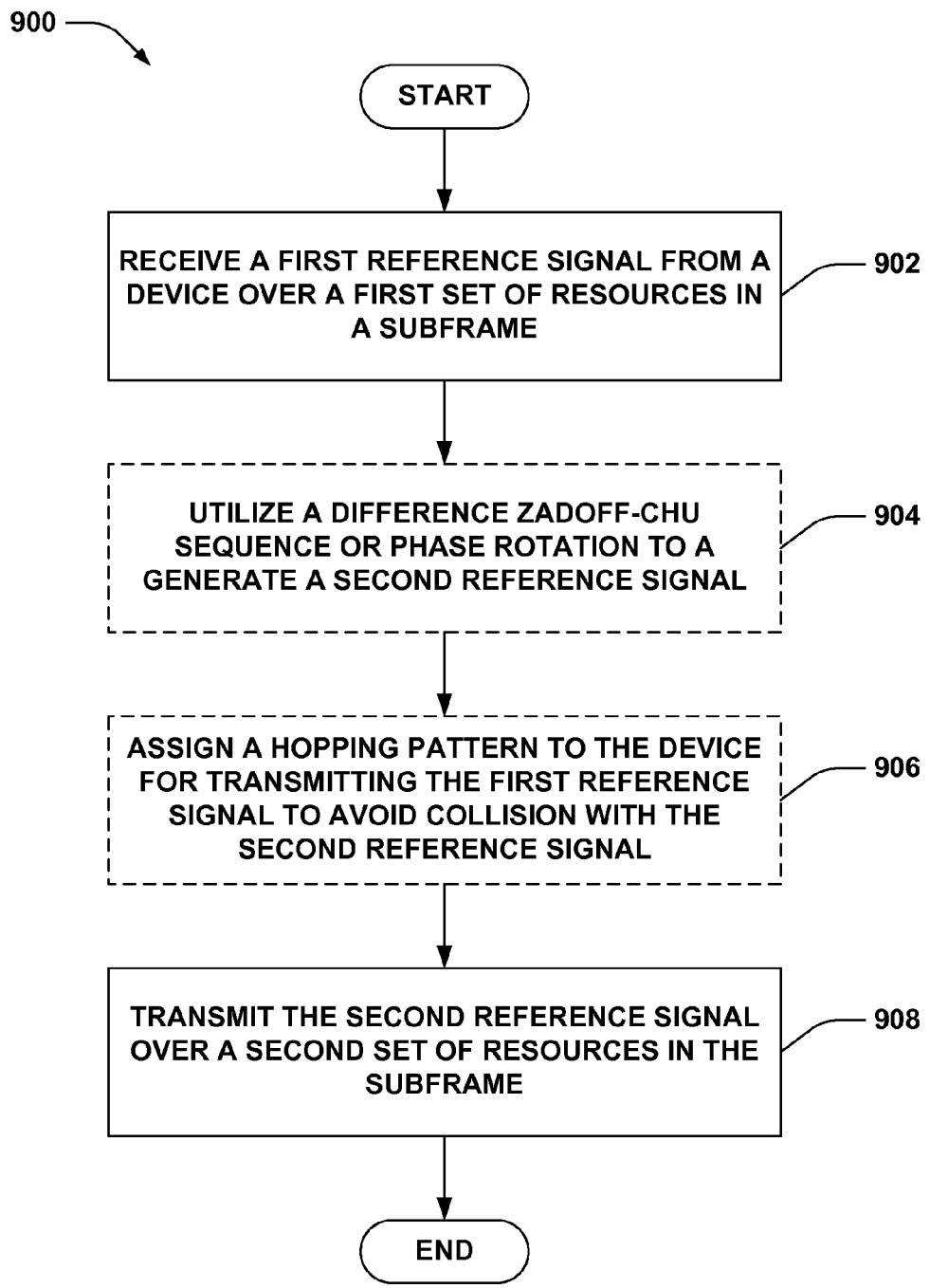
FIG. 9 is a flow chart of an aspect of a methodology for transmitting uplink reference signals to mitigate relay self-interference.

Now turning to FIG. 9, an example methodology 900 is illustrated for mitigating relay self-interference of reference signals. At 902, a first reference signal can be received from a device over a first set of resources in a subframe. Optionally, at 904, a different Zadoff-Chu sequence or phase rotation can be utilized to generate a second reference signal. This can mitigate collision among the reference signals. Optionally, at 906, a hopping pattern can be assigned to the device for transmitting the first reference signal to avoid collision with a second reference signal. This can also mitigate reference signal collision. At 908, the second reference signal can be transmitted over a second set of resources in the subframe.

Figure 10:
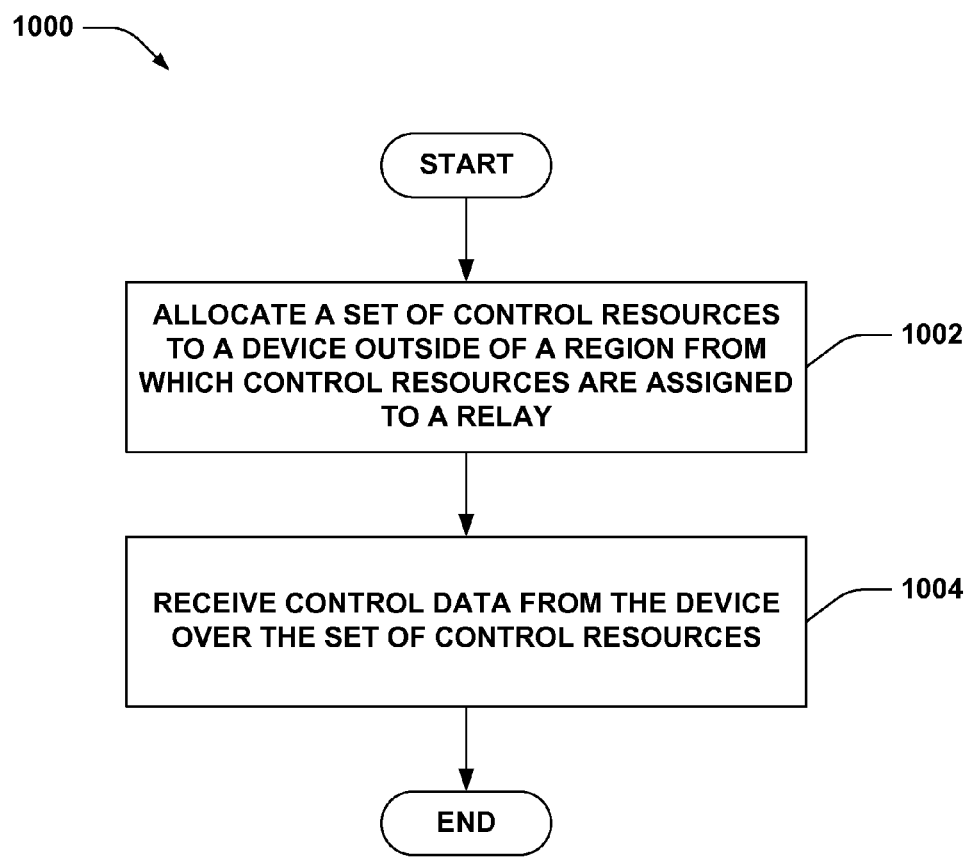
FIG. 10 is a flow chart of an aspect of a methodology for over-provisioning a control region to allocate control resources to a device to mitigate relay self-interference.

In FIG. 10, an example methodology 1000 is shown for allocating control resources to a device to mitigate relay self-interference. At 1002, a set of control resources outside of a region from which control resources are assigned to a relay can be allocated to a device. For example, the region can be over-provisioned, and resources that do not overlap the region can be assigned to the device. At 1004, control data can be received from the device over the set of control resources.

It will be appreciated that, in accordance with one or more aspects described herein, inferences can be made regarding determining a set of resources for assigning to a device for uplink or downlink communications, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
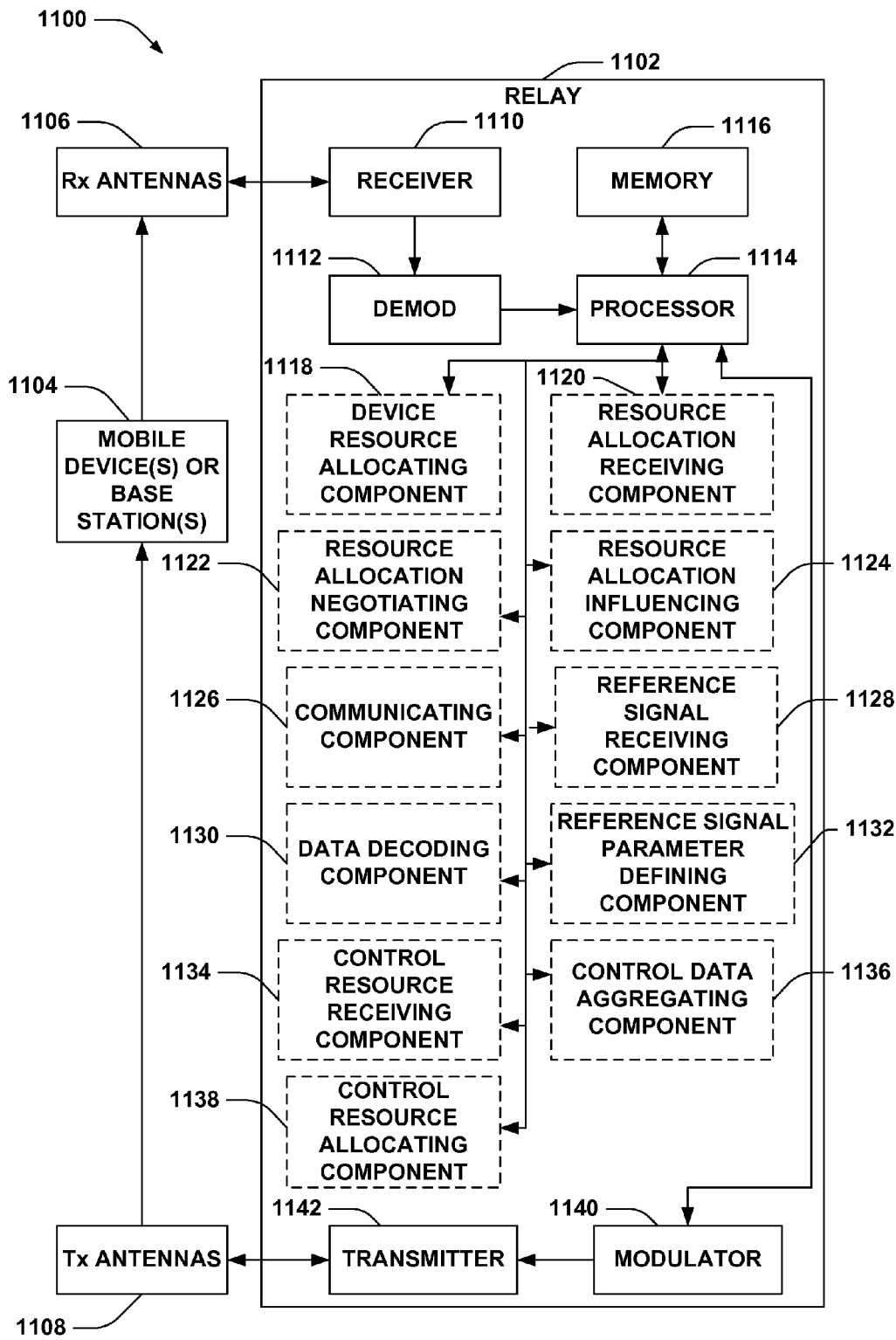
FIG. 11 is a block diagram of an aspect of a relay in accordance with aspects described herein.

FIG. 11 is an illustration of a system 1100 that facilitates mitigating relay self-interference. System 1100 includes a relay 1102 having a receiver 1110 that receives signal(s) from one or more mobile devices or base stations 1104 through a plurality of receive antennas 1106 (e.g., which can be of multiple network technologies), and a transmitter 1142 that transmits to the one or more mobile devices or base stations 1104 through a plurality of transmit antennas 1108 (e.g., which can be of multiple network technologies). For example, relay 1102 can transmit signals received from mobile devices 1104 to base stations 1104, and/or vice versa. Receiver 1110 can receive information from one or more receive antennas 1106 and is operatively associated with a demodulator 1112 that demodulates received information. In addition, in an example, receiver 1110 can receive from a wired backhaul link. Though depicted as separate antennas, it is to be appreciated that at least one of receive antennas 1106 and a corresponding one of transmit antennas 1108 can be combined as the same antenna. Demodulated symbols are analyzed by a processor 1114, which is coupled to a memory 1116 that stores information related to performing one or more aspects described herein.

Processor 1114, for example, can be a processor dedicated to analyzing information received by receiver 1110 and/or generating information for transmission by transmitter 1142, a processor that controls one or more components of relay 1102, and/or a processor that analyzes information received by receiver 1110, generates information for transmission by transmitter 1142, and controls one or more components of relay 1102. In addition, processor 1114 can perform one or more functions described herein and/or can communicate with components for such a purpose.

Memory 1116, as described, is operatively coupled to processor 1114 and can store data to be transmitted, received data, information related to available channels, data associated with analyzed signal and/or interference strength, information related to an assigned channel, power, rate, or the like, and any other suitable information for estimating a channel and communicating via the channel. Memory 1116 can additionally store protocols and/or algorithms associated with mitigating self-interference of relay 1102.

It will be appreciated that the data store (e.g., memory 1116) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), SyncLink DRAM (SLDRAM), and direct Rambus RAM (DRRAM). The memory 1116 of the subject systems and methods is intended to comprise, without being limited to, these and any other suitable types of memory.

Processor 1114 is further optionally coupled to a device resource allocating component 1118, which can be similar to device resource allocating component 208, resource allocation receiving component 1120, which can be similar to resource allocation receiving component 210, a resource allocation negotiating component 1122, which can be similar to resource allocation negotiating component 212, a resource allocation influencing component 1124, which can be similar to resource allocation influencing component 214, and/or a communicating component 1126, which can be similar to communicating components 216, 314, and 414. Processor 1114 can further be operatively coupled to a reference signal receiving component 1128, which can be similar to reference signal receiving component 308, a data decoding component 1130, which can be similar to data decoding component 310, a reference signal parameter defining component 1132, which can be similar to reference signal parameter defining component 312, a control resource receiving component 1134, which can be similar to control resource receiving component 408, a control data aggregating component 1136, which can be similar to control data aggregating component 410, and/or a control resource allocating component 1138, which can be similar to control resource allocating component 412.

Moreover, for example, processor 1114 can modulate signals to be transmitted using modulator 1140, and transmit modulated signals using transmitter 1142. Transmitter 1142 can transmit signals to mobile devices or base stations 1104 over Tx antennas 1108. Furthermore, although depicted as being separate from the processor 1114, it is to be appreciated that the device resource allocating component 1118, resource allocation receiving component 1120, resource allocation negotiating component 1122, resource allocating influencing component 1124, communicating component 1126, reference signal receiving component 1128, data decoding component 1130, reference signal parameter defining component 1132, control resource receiving component 1134, control data aggregating component 1136, control resource allocating component 1138, demodulator 1112, and/or modulator 1140 can be part of the processor 1114 or multiple processors (not shown), and/or stored as instructions in memory 1116 for execution by processor 1114.

Figure 12:
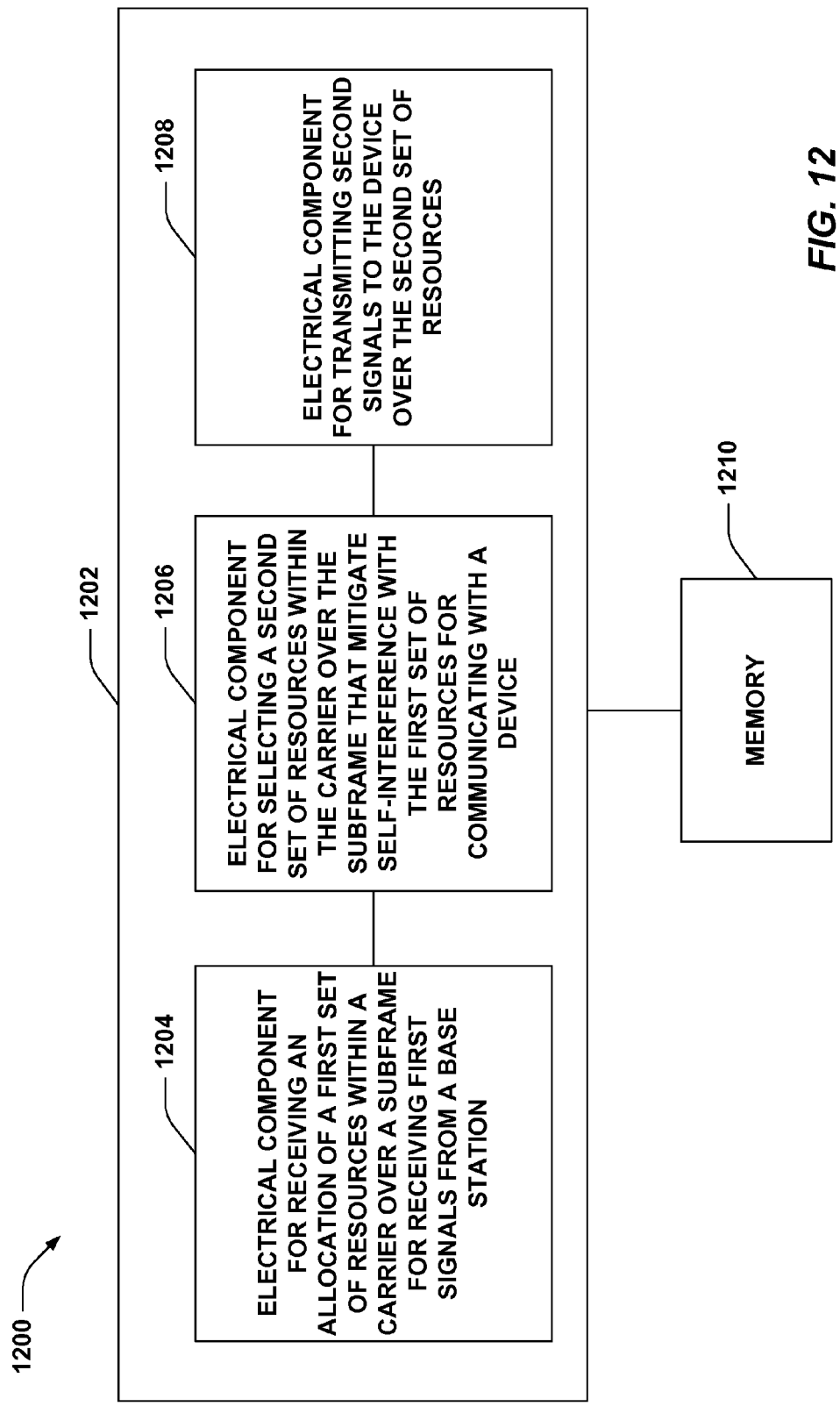
FIG. 12 is a block diagram of an aspect of a system that selects downlink resources for a device to mitigate relay self-interference with base station communications.

With reference to FIG. 12, illustrated is a system 1200 that selects downlink resources to mitigate relay self-interference. For example, system 1200 can reside at least partially within a relay. It is to be appreciated that system 1200 is represented as including functional blocks, which can be functional blocks that represent functions implemented by a processor, software, firmware, or combinations thereof. System 1200 includes a logical grouping 1202 of components (e.g., electrical components) that can act in conjunction. For instance, logical grouping 1202 can include an electrical component for receiving an allocation of a first set of resources within a carrier over a subframe for receiving first signals from a base station (1204). Further, logical grouping 1202 can include an electrical component for selecting a second set of resources within the carrier over the subframe that mitigate self-interference with the first set of resources for communicating with a device (1206). As described, for example, this can include selecting a set of resources over which a low CQI is indicated.

In addition, logical grouping 1202 can also include an electrical component for transmitting second signals to the device over the second set of resources (1208). For example, electrical component 1204 can include a resource allocation receiving component 210, as described above. In addition, for example, electrical component 1206, in an aspect, can include a device resource allocating component 208, as described above. Moreover, electrical component 1208 can include a communicating components 216, 314, 414, etc., for example.

Additionally, system 1200 can include a memory 1210 that retains instructions for executing functions associated with components 1204, 1206, and 1208. While shown as being external to memory 1210, it is to be understood that one or more of the components 1204, 1206, and 1208 can exist within memory 1210. In one example, components 1204, 1206, and 1208 can include at least one processor, or each component 1204, 1206, and 1208 can be a corresponding module of at least one processor. Moreover, in an additional or alternative example, components 1204, 1206, and 1208 can be a computer program product comprising a computer readable medium, where each component 1204, 1206, and 1208 can be corresponding code.

Figure 13:
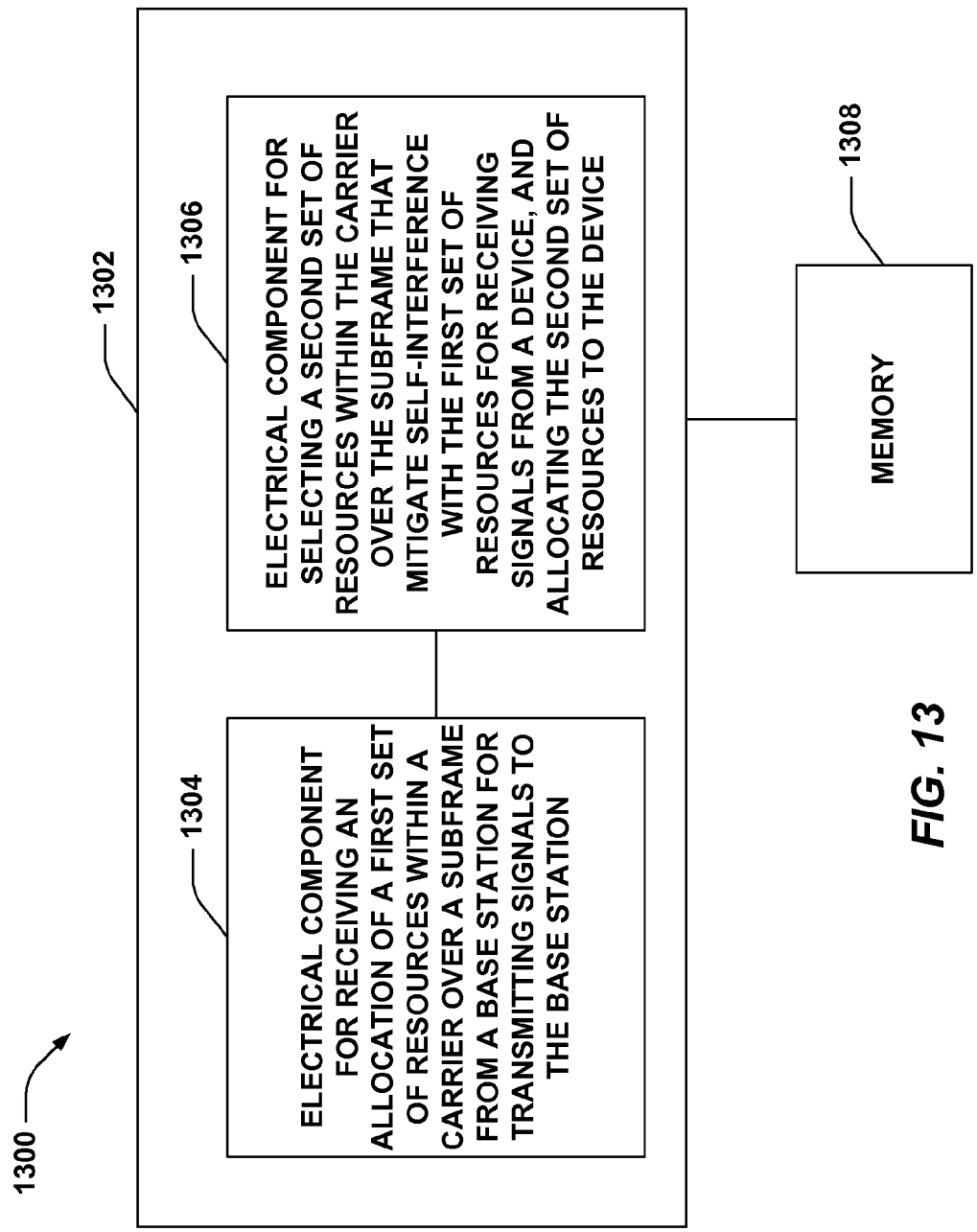
FIG. 13 is a block diagram of an aspect of a system that selects uplink resources for a device to mitigate relay self-interference with base station communications.

With reference to FIG. 13, illustrated is a system 1300 that selects uplink resources to mitigate relay self-interference. For example, system 1300 can reside at least partially within a relay. It is to be appreciated that system 1300 is represented as including functional blocks, which can be functional blocks that represent functions implemented by a processor, software, firmware, or combinations thereof. System 1300 includes a logical grouping 1302 of components (e.g., electrical components) that can act in conjunction. For instance, logical grouping 1302 can include an electrical component for receiving an allocation of a first set of resources within a carrier over a subframe from a base station for transmitting signals to the base station (1304). Further, logical grouping 1302 can include an electrical component for selecting a second set of resources within the carrier over the subframe that mitigate self-interference with the first set of resources for receiving signals from a device, and allocating the second set of resource to the device (1306).

As described, for example, electrical component 1306 can select the second set of resources to be a set of resources over which a SRS with a low or muted power is transmitted to the base station. In another example, electrical component 1306 can select the second set of resources from an over-provisioned portion of a control region. For example, electrical component 1304 can include a resource allocation receiving component 210, a control resource receiving component 408, etc. In addition, for example, electrical component 1306, in an aspect, can include a device resource allocating component 208, control resource allocating component 412, etc., for example.

Additionally, system 1300 can include a memory 1308 that retains instructions for executing functions associated with components 1304 and 1306. While shown as being external to memory 1308, it is to be understood that one or more of the components 1304 and 1306 can exist within memory 1308. In one example, components 1304 and 1306 can include at least one processor, or each component 1304 and 1306 can be a corresponding module of at least one processor. Moreover, in an additional or alternative example, components 1304 and 1306 can be a computer program product comprising a computer readable medium, where each component 1304 and 1306 can be corresponding code.

Figure 14:
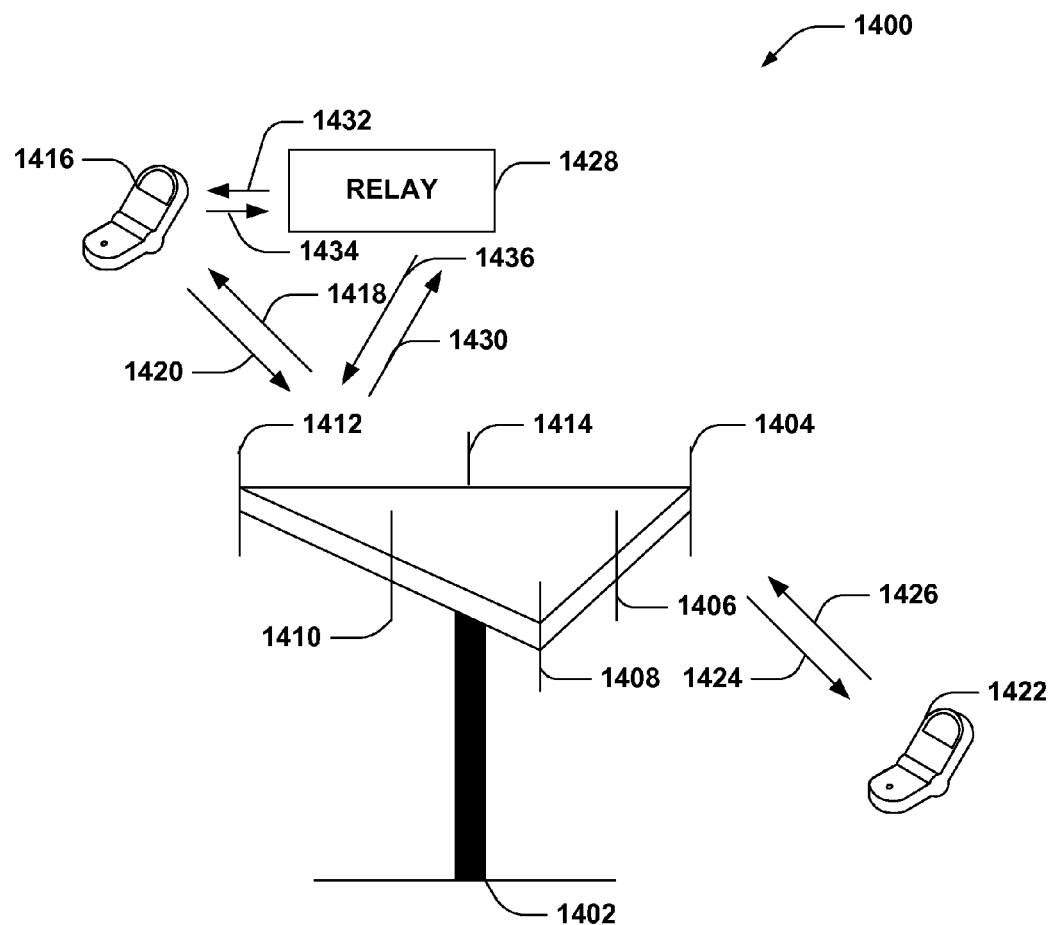
FIG. 14 is a block diagram of an aspect of a wireless communication system in accordance with various aspects set forth herein.

Referring now to FIG. 14, a wireless communication system 1400 is illustrated in accordance with various embodiments presented herein. System 1400 includes a base station 1402 that can include multiple antenna groups. For example, one antenna group can include antennas 1404 and 1406, another group can include antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn include a plurality of components associated with signal transmission and reception (e.g., processors, modulators, multiplexers, demodulators, demultiplexers, antennas, etc.), as is appreciated.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, positioning systems (e.g., GPS), PDAs, tablets, smart books, netbooks, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage area, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology. According to an example, system 1400 can be a multiple-input multiple-output (MIMO) communication system.

In addition, system 1400 includes a relay 1428 that can facilitate receiving and transmitting signals from base station 1402 to mobile device 1416, and/or vice versa. For example, relay 1428 can receive signals from base station 1402 over forward link 1430, and can transmit the signals to mobile device 1416 over forward link 1432. Thus, for example, mobile device 1416 can receive signals related to base station 1402 over forward links 1418 and/or 1432. In another example, relay 1428 can receive signals from mobile device 1416 over reverse link 1434, and can similarly transmit the signals to base station 1402 over reverse link 1436. Relay 1428 can mitigate self-interference, as described herein.

Figure 15:
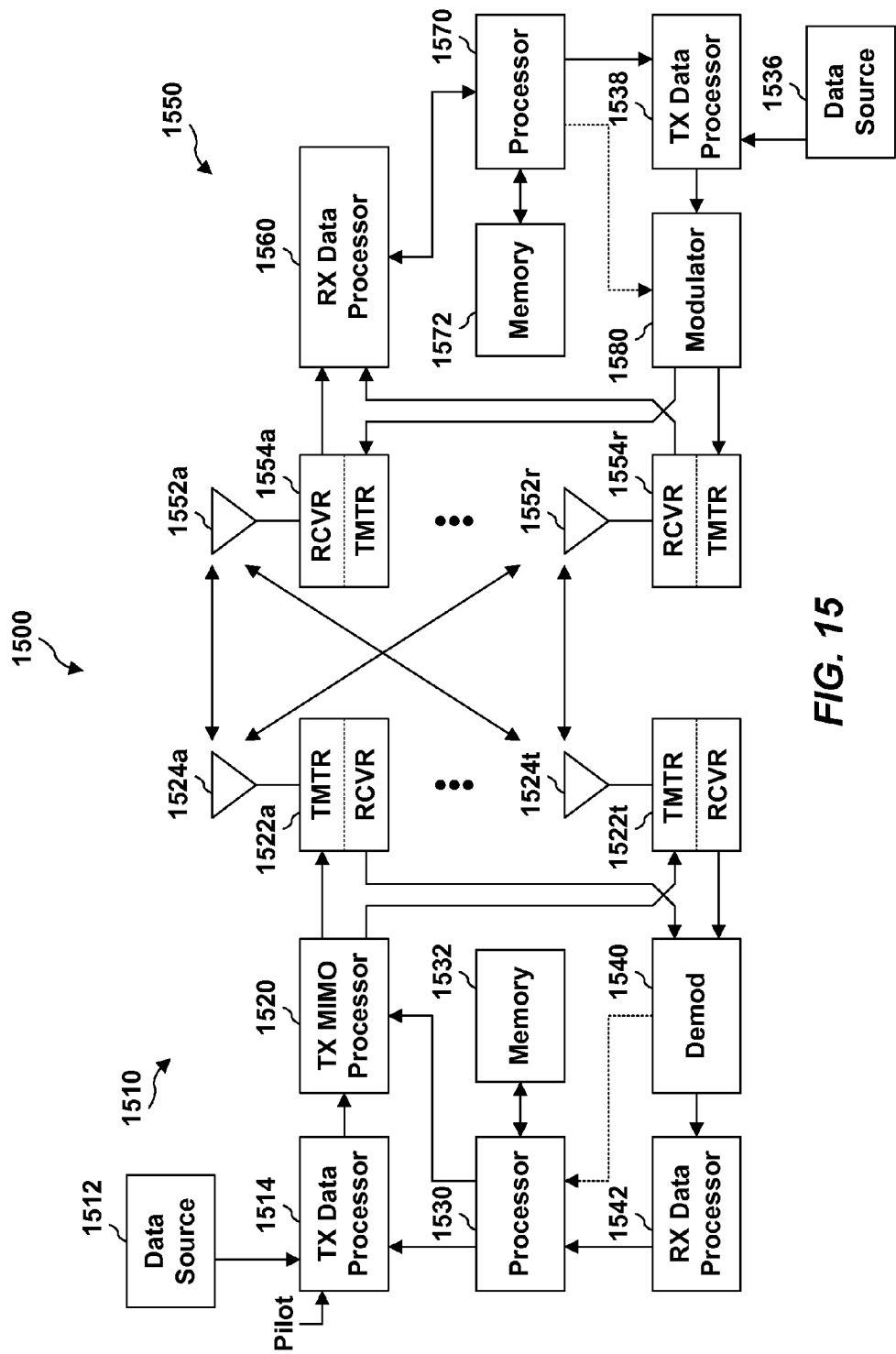
FIG. 15 is a schematic block diagram of an aspect of a wireless network environment that can be employed in conjunction with the various systems and methods described herein.

FIG. 15 shows an example wireless communication system 1500. The wireless communication system 1500 depicts one base station 1510 and one mobile device 1550 for sake of brevity. However, it is to be appreciated that system 1500 can include more than one base station and/or more than one mobile device, wherein additional base stations and/or mobile devices can be substantially similar or different from example base station 1510 and mobile device 1550 described below. In addition, it is to be appreciated that base station 1510 and/or mobile device 1550 can employ the systems (e.g., FIGS. 1-4 and 11-14) and/or methods (e.g., FIGS. 5-10) described herein to facilitate wireless communication there between. For example, components or functions of the systems and/or methods described herein can be part of a memory 1532 and/or 1572 and/or processors 1530 and/or 1570 described below, and/or can be executed by processors 1530 and/or 1570 to perform the disclosed functions.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At mobile device 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from mobile device 1550 are received by antennas 1524, conditioned by receivers 1522, demodulated by a demodulator 1540, and processed by a RX data processor 1542 to extract the reverse link message transmitted by mobile device 1550. Further, processor 1530 can process the extracted message to determine which precoding matrix to use for determining the beamforming weights.

Processors 1530 and 1570 can direct (e.g., control, coordinate, manage, etc.) operation at base station 1510 and mobile device 1550, respectively. Respective processors 1530 and 1570 can be associated with memory 1532 and 1572 that store program codes and data. In another example, portions of the base station 1510 and portions of device 1550 can be implemented within a relay to provide functionality as described herein. Thus, for example, processors 1530 and 1570 can also perform actions to mitigate relay self-interference, as described.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software/firmware, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication in a full duplex relay, comprising:
   receiving an allocation of a first set of resources within a carrier over a subframe for receiving first signals at a relay from a base station;
   selecting, at the relay, a second set of resources within the carrier over the subframe that mitigate self-interference with the first set of resources for communicating from the relay to a device; and
   transmitting, from the relay, second signals to the device on the second set of resources.

2. The method of claim 1, further comprising indicating to the base station a set of resources over which data reception is not desired from the base station, wherein the selecting the second set of resources comprises selecting the second set of resources from the set of resources.

3. The method of claim 2, wherein the indicating comprises sending, from the relay, a channel quality indicator (CQI) report for the set of resources indicating a CQI value below a threshold CQI level.

4. The method of claim 1, further comprising:
   receiving a UE-specific reference signal from the base station in the subframe; and
   decoding communications received over the first set of resources using the UE-specific reference signal.

5. The method of claim 1, further comprising:
   declaring a second subframe as a multimedia broadcast over single frequency network (MBSFN) subframe to avoid collision with a cell-specific reference signal; and
   receiving the cell-specific reference signal from the base station within the second subframe.

6. The method of claim 1, further comprising receiving control data over the first set of resources, wherein the transmitting the second signals comprises transmitting the control data using a lower aggregation level than the control data as received over the first set of resources.

7. The method of claim 1, wherein the receiving the allocation of the first set of resources comprises receiving the allocation in a frequency division multiplexing (FDM) control region.

8. The method of claim 7, wherein the FDM control region is a relay physical downlink control channel (R-PDCCH).

9. The method of claim 1, wherein the first set of resources are semi-statically assigned, and the selecting comprises selecting the second set of resources that do not overlap the first set of resources.

10. An apparatus for wireless communication in a full duplex relay, comprising:
    at least one processor configured to:

receive an allocation of a first set of resources within a carrier over a subframe for receiving first signals at a relay from a base station;

select, at the relay, a second set of resources within the carrier over the subframe that mitigate self-interference with the first set of resources for communicating from the relay to a device; and transmit, from the relay, second signals to the device on the second set of resources; and a memory coupled to the at least one processor.

11. The apparatus of claim 10, wherein the at least one processor is further configured to indicate to the base station a set of resources over which data reception is not desired from the base station, and the at least one processor selects the second set of resources from the set of resources.

12. The apparatus of claim 11, wherein the at least one processor indicates the set of resources at least in part by sending, from the relay, a channel quality indicator (CQI) report for the set of resources indicating a CQI value below a threshold CQI level.

13. The apparatus of claim 10, wherein the at least one processor is further configured to:

receive a UE-specific reference signal from the base station in the subframe; and decode communications received over the first set of resources using the UE-specific reference signal.

14. The apparatus of claim 10, wherein the at least one processor is further configured to:

declare a second subframe as a multimedia broadcast over single frequency network (MBSFN) subframe to avoid collision with a cell-specific reference signal; and receive the cell-specific reference signal from the base station within the second subframe.

15. The apparatus of claim 10, wherein the at least one processor receives the allocation in a frequency division multiplexing (FDM) control region.

16. The apparatus of claim 15, wherein the FDM control region is a relay physical downlink control channel (R-PDCCH).

17. The apparatus of claim 10, wherein the at least one processor is further configured to receive control data over the first set of resources, and wherein the at least one processor transmits the control data in the second signals using a lower aggregation level than the control data as received over the first set of resources.

18. An apparatus for wireless communication in a full duplex relay, comprising:

means for receiving an allocation of a first set of resources within a carrier over a subframe for receiving first signals at a relay from a base station;

means for selecting, at the relay, a second set of resources within the carrier over the subframe that mitigate self-interference with the first set of resources for communicating from the relay to a device; and means for transmitting, from the relay, second signals to the device over the second set of resources.

19. The apparatus of claim 18, further comprising means for indicating to the base station a set of resources over which data reception is not desired from the base station, wherein the means for selecting selects the second set of resources from the set of resources.

20. The apparatus of claim 19, wherein the means for indicating sends, from the relay, a channel quality indicator (CQI) report for the set of resources indicating a CQI value below a threshold CQI level.

21. The apparatus of claim 18, further comprising means for receiving a UE-specific reference signal from the base station in the subframe for decoding communications received over the first set of resources.

22. The apparatus of claim 18, further comprising means for declaring a second subframe as a multimedia broadcast over single frequency network (MBSFN) subframe to avoid collision with a cell-specific reference signal, and wherein the means for receiving receives the cell-specific reference signal from the base station within the second subframe.

23. The apparatus of claim 18, wherein the means for receiving receives the allocation in a frequency division multiplexing (FDM) control region.

24. The apparatus of claim 23, wherein the FDM control region is a relay physical downlink control channel (R-PDCCH).

25. The apparatus of claim 18, further comprising means for aggregating control data using a lower aggregation level than used for signals over which the control data is received, wherein the means for transmitting receives the control data from the base station over the first set of resources, and transmits the control data with the lower aggregation level over the second set of resources.

26. A non-transitory computer-readable medium for wireless communication in a full duplex relay, comprising:

code for receiving an allocation of a first set of resources within a carrier over a subframe for receiving first signals at a relay from a base station;

code for selecting, at the relay, a second set of resources within the carrier over the subframe that mitigate self-interference with the first set of resources for communicating from the relay to a device; and code for transmitting, from the relay, second signals to the device on the second set of resources.

27. The computer-readable medium of claim 26, further comprising code for indicating to the base station a set of resources over which data reception is not desired from the base station, and the code for selecting selects the second set of resources from the set of resources.

28. The computer-readable medium of claim 27, wherein the code for indicating sends, from the relay, a channel quality indicator (CQI) report for the set of resources indicating a CQI value below a threshold CQI level.

29. The computer-readable medium of claim 26, further comprising:

code for receiving a UE-specific reference signal from the base station in the subframe; and code for decoding communications received over the first set of resources using the UE-specific reference signal.

30. The computer-readable medium of claim 26, further comprising:

code for declaring a second subframe as a multimedia broadcast over single frequency network (MBSFN) subframe to avoid collision with a cell-specific reference signal; and code for receiving the cell-specific reference signal from the base station within the second subframe.

31. The computer-readable medium of claim 26, wherein the code for receiving receives the allocation in a frequency division multiplexing (FDM) control region.

32. The computer-readable medium of claim 31, wherein the FDM control region is a relay physical downlink control channel (R-PDCCH).

33. The computer-readable medium of claim 26, further comprising code for receiving control data over the first set of resources, and the code for transmitting transmits the control data in the second signals using a lower aggregation level than the control data as received over the first set of resources.

34. An apparatus for wireless communication in a full duplex relay, comprising:
 a resource allocation receiving component for receiving an allocation of a first set of resources within a carrier over a subframe for receiving first signals at a relay from a base station;
 a device resource allocating component for selecting, at the relay, a second set of resources within the carrier over the subframe that mitigate self-interference with the first set of resources for communicating from the relay to a device; and
 a communicating component for transmitting, from the relay, second signals to the device over the second set of resources.

35. The apparatus of claim 34, further comprising a component for indicating to the base station a set of resources over which data reception is not desired from the base station, wherein the device resource allocating component selects the second set of resources from the set of resources.

36. The apparatus of claim 35, wherein the component is a resource allocation influencing component that sends, from the relay, a channel quality indicator (CQI) report for the set of resources indicating a CQI value below a threshold CQI level.

37. The apparatus of claim 34, further comprising a reference signal receiving component for receiving a UE-specific reference signal from the base station in the subframe for decoding communications received over the first set of resources.

38. The apparatus of claim 34, further comprising a reference signal receiving component for declaring a second subframe as a multimedia broadcast over single frequency network (MBSFN) subframe to avoid collision with a cell-specific reference signal and for receiving the cell-specific reference signal from the base station within the second subframe.

39. The apparatus of claim 34, wherein the resource allocation receiving component receives the allocation in a frequency division multiplexing (FDM) control region.

40. The apparatus of claim 39, wherein the FDM control region is a relay physical downlink control channel (R-PDCCH).

41. The apparatus of claim 34, further comprising a control data aggregating component for aggregating control data for transmission over the second set of resources using a lower aggregation level than the control data as received over the first set of resources, wherein the communicating component receives control data from the base station over the first set of resources.

42. A method of wireless communication in a full duplex relay, comprising:
 receiving an allocation of a first set of resources within a carrier over a subframe from a base station for transmitting signals from a relay to the base station;
 selecting, at the relay, a second set of resources within the carrier over the subframe that mitigate self-interference with the first set of resources for receiving signals from the device at the relay; and
 allocating the second set of resources to the device for transmitting second signals to the relay.

43. The method of claim 42, further comprising indicating to the base station a set of resources over which assignment for data transmission to the base station is not desired, wherein the selecting the second set of resources comprises selecting the second set of resources from the set of resources.

44. The method of claim 43, wherein the indicating comprises sending a sounding reference signal (SRS) transmission with signal power below a threshold level on the set of resources.

45. The method of claim 42, further comprising transmitting a first reference signal over the first set of resources, wherein a second reference signal is received over the second set of resources.

46. The method of claim 45, further comprising utilizing a different Zadoff-Chu sequence or phase rotation for encoding the first reference signal than a Zadoff-Chu sequence or phase rotation used for encoding the second reference signal.

47. The method of claim 45, further comprising assigning a hopping pattern to the device for the second reference signal that mitigates collision with the first reference signal.

48. The method of claim 42, wherein the first set of resources correspond to a first control channel and the second set of resources correspond to second control channel.

49. The method of claim 48, wherein the selecting comprises selecting the second set of resources from a portion of an over-provisioned control region that does not overlap the first set of resources.

50. The method of claim 48, further comprising receiving control data from the device over a shared data channel region, wherein the selecting comprises selecting the second set of resources within the shared data channel region.

51. An apparatus for wireless communication in a full duplex relay, comprising:
 at least one processor configured to:
  receive an allocation of a first set of resources within a carrier over a subframe from a base station for transmitting signals from a relay to the base station;
  select, at the relay, a second set of resources within the carrier over the subframe that mitigate self-interference with the first set of resources for receiving signals from the device at the relay; and
  allocate the second set of resources to the device for transmitting second signals to the relay; and
 a memory coupled to the at least one processor.

52. The apparatus of claim 51, wherein the at least one processor is further configured to indicate to the base station a set of resources over which assignment for data transmission to the base station is not desired, and the at least one processor selects the second set of resources from the set of resources.

53. The apparatus of claim 52, wherein the at least one processor indicates the set of resources at least in part by sending a sounding reference signal (SRS) transmission with signal power below a threshold level on the set of resources.

54. The apparatus of claim 51, wherein the at least one processor is further configured to transmit a first reference signal over the first set of resources, wherein a second reference signal is received over the second set of resources.

55. The apparatus of claim 54, wherein the at least one processor is further configured to utilize a different Zadoff-Chu sequence or phase rotation for encoding the first reference signal than a Zadoff-Chu sequence or phase rotation used for encoding the second reference signal.

56. The apparatus of claim 54, wherein the at least one processor is further configured to assign a hopping pattern to the device for the second reference signal that mitigates collision with the first reference signal.

57. The apparatus of claim 51, wherein the first set of resources correspond to a first control channel and the second set of resources correspond to second control channel.

58. The apparatus of claim 57, wherein the at least one processor selects the second set of resources from a portion of an over-provisioned control region that does not overlap the first set of resources.

59. The apparatus of claim 57, wherein the at least one processor selects the second set of resources within a shared data channel region.

60. An apparatus for wireless communication in a full duplex relay, comprising:
means for receiving an allocation of a first set of resources within a carrier over a subframe from a base station for transmitting signals from a relay to the base station; and
means for selecting, at the relay, a second set of resources within the carrier over the subframe that mitigate self-interference with the first set of resources for receiving signals from the device at the relay, and allocating the second set of resources to the device for transmitting second signals to the relay.

61. The apparatus of claim 60, further comprising means for indicating to the base station a set of resources over which assignment for data transmission to the base station is not desired, wherein the means for selecting selects the second set of resources from the set of resources.

62. The apparatus of claim 61, wherein the means for indicating sends a sounding reference signal (SRS) transmission with signal power below a threshold level on the set of resources.

63. The apparatus of claim 60, further comprising means for transmitting a first reference signal over the first set of resources, wherein a second reference signal is received over the second set of resources.

64. The apparatus of claim 63, further comprising means for utilizing a different Zadoff-Chu sequence or phase rotation for encoding the first reference signal than a Zadoff-Chu sequence or phase rotation used for encoding the second reference signal.

65. The apparatus of claim 63, further comprising means for assigning a hopping pattern to the device for the second reference signal that mitigates collision with the first reference signal.

66. The apparatus of claim 60, wherein the first set of resources correspond to a first control channel and the second set of resources correspond to second control channel.

67. The apparatus of claim 66, wherein the means for selecting selects the second set of resources from a portion of an over-provisioned control region that does not overlap the first set of resources.

68. The apparatus of claim 66, further comprising means for receiving control data from the device over a shared data channel region, wherein the means for selecting selects the second set of resources within the shared data channel region.

69. A non-transitory computer-readable medium for wireless communication in a full duplex relay, comprising:
code for receiving an allocation of a first set of resources within a carrier over a subframe from a base station for transmitting signals from a relay to the base station;
code for selecting, at the relay, a second set of resources within the carrier over the subframe that mitigate self-interference with the first set of resources for receiving signals from the device at the relay; and
code for allocating the second set of resources to the device for transmitting second signals to the relay.

70. The computer-readable medium of claim 69, further comprising code for indicating to the base station a set of resources over which assignment for data transmission to the base station is not desired, wherein the code for selecting selects the second set of resources from the set of resources.

71. The computer-readable medium of claim 70, wherein the code for indicating sends a sounding reference signal (SRS) transmission with signal power below a threshold level on the set of resources.

72. The computer-readable medium of claim 69, further comprising code for transmitting a first reference signal over the first set of resources, wherein a second reference signal is received over the second set of resources.

73. The computer-readable medium of claim 72, further comprising code for utilizing a different Zadoff-Chu sequence or phase rotation for encoding the first reference signal than a Zadoff-Chu sequence or phase rotation used for encoding the second reference signal.

74. The computer-readable medium of claim 72, further comprising code for assigning a hopping pattern to the device for the second reference signal that mitigates collision with the first reference signal.

75. The computer-readable medium of claim 69, wherein the first set of resources correspond to a first control channel and the second set of resources correspond to second control channel.

76. The computer-readable medium of claim 75, wherein the code for selecting selects the second set of resources from a portion of an over-provisioned control region that does not overlap the first set of resources.

77. The computer-readable medium of claim 75, wherein the code for selecting selects the second set of resources within a shared data channel region.

78. An apparatus for wireless communication in a full duplex relay, comprising:
a resource allocation receiving component for receiving an allocation of a first set of resources within a carrier over a subframe from a base station for transmitting signals at a relay to the base station; and
a component for selecting, at the relay, a second set of resources within the carrier over the subframe that mitigate self-interference with the first set of resources for receiving signals from the device at the relay, and allocating the second set of resources to the device for transmitting second signals to the relay.

79. The apparatus of claim 78, further comprising another component for indicating to the base station a set of resources over which assignment for data transmission to the base station is not desired, wherein the component is a device resource allocating component that selects the second set of resources from the set of resources.

80. The apparatus of claim 79, wherein the another component for indicating is a resource allocation influencing component that sends a sounding reference signal (SRS) transmission with signal power below a threshold level on the set of resources.

81. The apparatus of claim 78, further comprising a communicating component for transmitting a first reference signal over the first set of resources, and receiving a second reference signal over the second set of resources.

82. The apparatus of claim 81, further comprising a reference signal parameter defining component for utilizing a different Zadoff-Chu sequence or phase rotation for encoding the first reference signal than a Zadoff-Chu sequence or phase rotation used for encoding the second reference signal.

83. The apparatus of claim 81, further comprising a reference signal parameter defining component for assigning a hopping pattern to the device for the second reference signal that mitigates collision with the first reference signal.

84. The apparatus of claim 78, wherein the first set of resources correspond to a first control channel and the second set of resources correspond to second control channel.

85. The apparatus of claim 84, wherein the component for selecting is a control resource allocating component that selects the second set of resources from a portion of an over-provisioned control region that does not overlap the first set of resources.

86. The apparatus of claim 84, further comprising a communicating component for receiving control data from the device over a shared data channel region, wherein the component for selecting is a control resource allocating component that selects the second set of resources within the shared data channel region.

\* \* \* \* \*